US009544658B2

(12) United States Patent
Tanaka et al.

(10) Patent No.: US 9,544,658 B2
(45) Date of Patent: Jan. 10, 2017

(54) VIDEO SIGNAL TRANSMISSION/RECEPTION METHOD, DISPLAY DEVICE, AND DECODING DEVICE

(75) Inventors: Mayuko Tanaka, Tokyo (JP); Nobuaki Kabuto, Tokyo (JP)

(73) Assignee: HITACHI MAXELL, LTD., Osaka (JP)

(*) Notice: Subject to any disclaimer, the term of this patent is extended or adjusted under 35 U.S.C. 154(b) by 0 days.

(21) Appl. No.: 14/353,860

(22) PCT Filed: Oct. 26, 2011

(86) PCT No.: PCT/JP2011/005963
§ 371 (c)(1),
(2), (4) Date: May 27, 2014

(87) PCT Pub. No.: WO2013/061366
PCT Pub. Date: May 2, 2013

(65) Prior Publication Data
US 2014/0304758 A1 Oct. 9, 2014

(51) Int. Cl.
*H04N 21/647* (2011.01)
*H04N 21/436* (2011.01)
*H04N 21/442* (2011.01)
*H04N 21/482* (2011.01)
*H04N 21/488* (2011.01)
(Continued)

(52) U.S. Cl.
CPC .. *H04N 21/64707* (2013.01); *H04N 21/43615* (2013.01); *H04N 21/43622* (2013.01); *H04N 21/43635* (2013.01); *H04N 21/44231* (2013.01); *H04N 21/4622* (2013.01); *H04N 21/482* (2013.01); *H04N 21/4882* (2013.01)

(58) Field of Classification Search
CPC ........... H04N 21/64707; H04N 21/43615; H04N 21/43635; H04N 21/4622; H04N 21/43622; H04N 21/44231; H04N 21/482
See application file for complete search history.

(56) References Cited

U.S. PATENT DOCUMENTS 6,738,101 B1 * 5/2004 Utsunomiya ........ H04N 5/4401
345/552
8,670,645 B2 3/2014 Nakajima et al.
(Continued)

FOREIGN PATENT DOCUMENTS

JP 2006-157339 A 6/2006
JP 2009-284403 A 12/2009
(Continued)

OTHER PUBLICATIONS

International Search Report, w/ English translation thereof, issued in International Application No. PCT/JP2011/005963 dated Dec. 6, 2011.
(Continued)

*Primary Examiner* — Pinkal R Chokshi
(74) *Attorney, Agent, or Firm* — McDermott Will & Emery LLP

(57) ABSTRACT

According to the present invention, even when the operation requested through the second transmission path (or first transmission path) cannot be performed, it is possible to perform the requested operation by using the function of the device coupled to the first transmission path (or second transmission path).

8 Claims, 18 Drawing Sheets

(51) Int. Cl.
 H04N 21/4363 (2011.01)
 H04N 21/462 (2011.01)

(56) References Cited

U.S. PATENT DOCUMENTS

| | | | | |
|---|---|---|---|---|
| 9,167,419 | B2* | 10/2015 | Harrison | H04L 12/189 |
| 2005/0125552 | A1* | 6/2005 | Katayama | H04L 29/06 709/232 |
| 2006/0117120 | A1* | 6/2006 | Takagi | 710/62 |
| 2009/0052450 | A1* | 2/2009 | Mockett | 370/390 |
| 2009/0276815 | A1* | 11/2009 | Casagrande | 725/87 |
| 2010/0293598 | A1* | 11/2010 | Collart | G06F 17/30056 726/3 |
| 2012/0210241 | A1* | 8/2012 | Wong et al. | 715/739 |
| 2013/0014184 | A1* | 1/2013 | Mank | H04L 12/2809 725/80 |

FOREIGN PATENT DOCUMENTS

| | | |
|---|---|---|
| JP | 2011-199567 A | 10/2011 |
| WO | 2008/056718 A1 | 5/2008 |

OTHER PUBLICATIONS

Office Action Japanese Patent Application No. 2013-540502 dated Feb. 10, 2015.

\* cited by examiner

F I G. 4
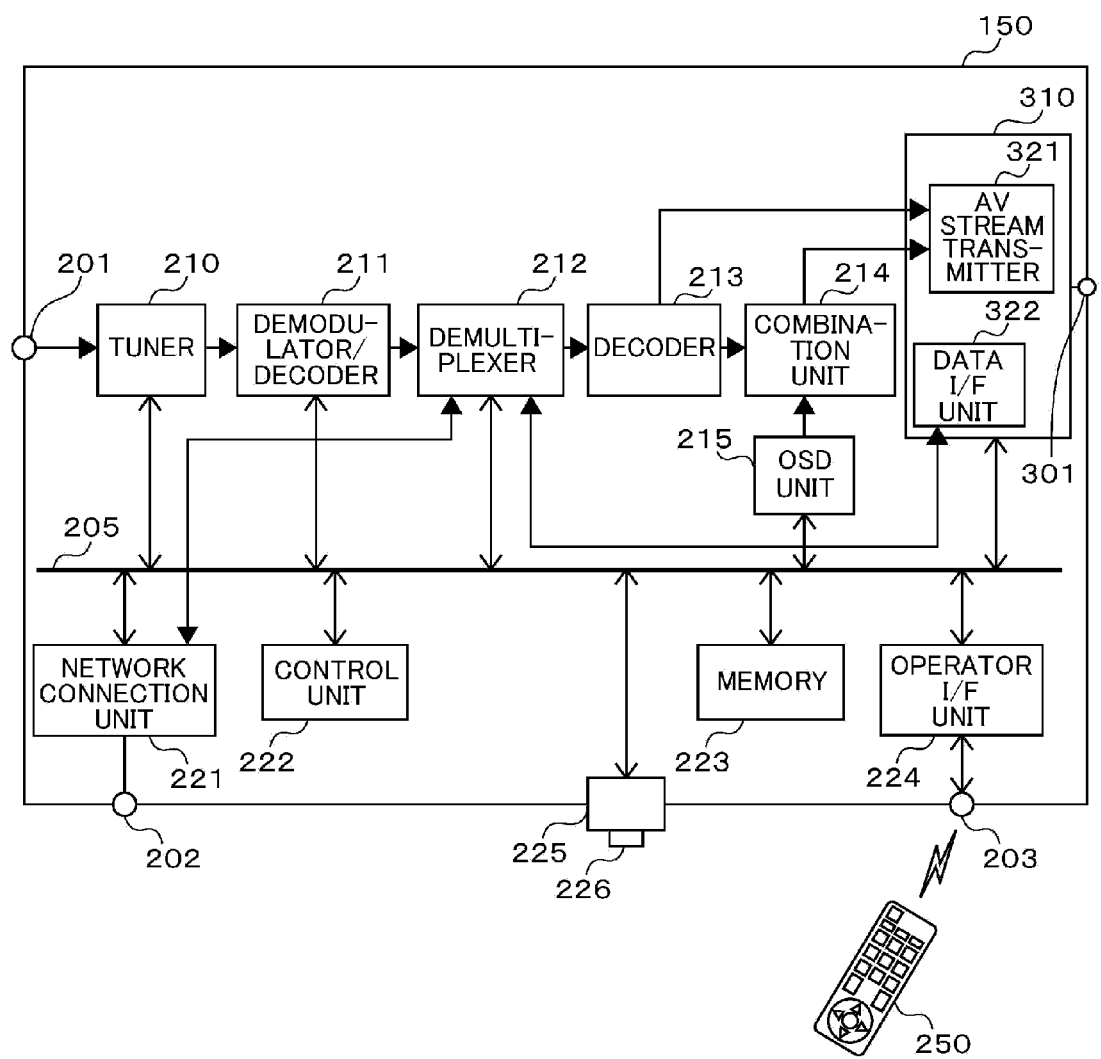

F I G. 6
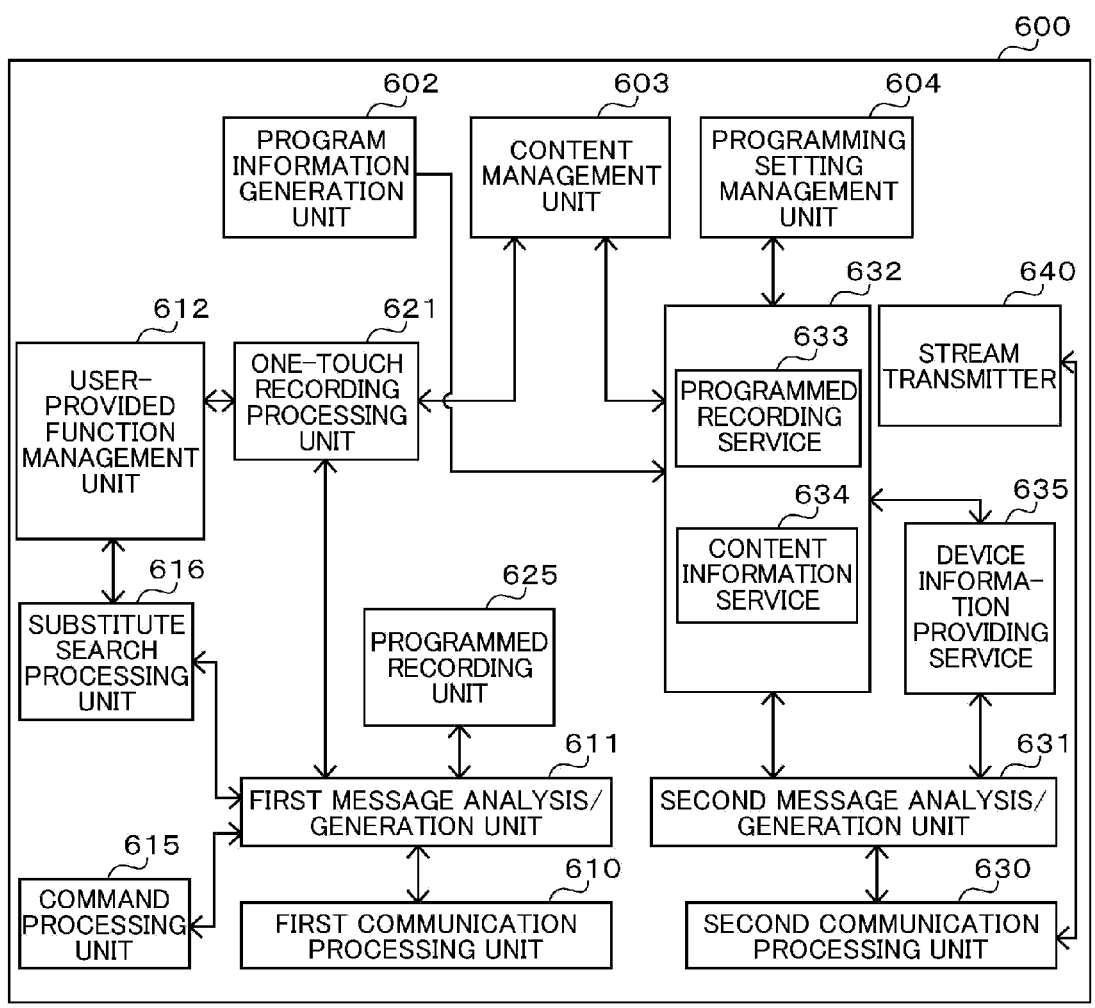

| PATTERN | CONFIGURATION PATTERN OF [RECORD SOURCE] |
|---|---|
| 1 | ["Digital Service"][Digital Service Identification] |
| 2 | ["Own Source"] |

| CONFIGURATION OF [DIGITAL SERVICE IDENTIFICATION] |
|---|
| [Service Identification Method][Digital Broadcast System][Service Identification] |

F I G. 1 7 A

<Discover Agent>[SEARCH FUNCTION]

F I G. 1 7 B

<Vendor Command with ID>[Vendor ID][Vendor Opcode][Vendor Parameter]

F I G. 1 7 C

| VALUE | | DESCRIPTION |
|---|---|---|
| "Discover Agent" | 0 | SEARCH FOR SUBSTITUTE FEATURE |
| "Request Substitute Feature" | 1 | REQUEST PERFORMANCE OF SUBSTITUTE FEATURE |
| "Report Substitute Feature Status" | 2 | REPORT PERFORMANCE RESULT OF SUBSTITUTE FEATURE |

F I G. 1 7 D

| VALUE | | DESCRIPTION |
|---|---|---|
| "One Touch Record" | 0 | ONE-TOUCH RECORDING |
| "Timer Programming" | 1 | PROGRAMMED RECORDING |

F I G. 1 7 E

| Initiator | | | | Destination | | | | EOM | ACK |
|---|---|---|---|---|---|---|---|---|---|
| 0 | 0 | 0 | 0 | 0 | 0 | 0 | 1 | 1 | 1 |

F I G. 1 7 F

<Vendor Command>[Vendor Opcode][Vendor Parameter]

F I G. 1 8 A

<Request Substitute Feature>[SUBSTITUTE FEATURE][RECORD SOURCE INFORMATION]

F I G. 1 8 B

<Request Substitute Feature Status>[SUBSTITUTE FEATURE][Result]

F I G. 1 8 C

| VALUE | | DESCRIPTION |
|---|---|---|
| "Success" | 0 | SUCCESS |
| "Failure" | 1 | FAILURE |
| "Acceptable" | 2 | WITH FUNCTION |
| "Tuner" | 3 | WITH TUNER |
| "No Feature" | 4 | WITHOUT FUNCTION |

F I G. 1 9 A

```
M-SEARCH * HTTP/1.1
HOST: hostname:portNumber
MAN: "ssdp:discover"
MX: 3
ST: hdmi:logicalAddress:1
```

F I G. 1 9 B

```
HTTP/1.1 200 OK
CACHE-CONTROL: max-age = 1800
DATE: DATE AND TIME WHEN RESPONSE WAS MADE
NW-ID: IDENTIFIER OF DEVICE IN SECOND NETWORK
ST: TARGET TO BE SEARCHED FOR
```

F I G. 1 9 C

```
M-SEARCH * HTTP/1.1
HOST: hostname:portNumber
MAN: "ssdp:discover"
MX: 3
ST: decoding method::H264 Hi422P Level4
```

VIDEO SIGNAL TRANSMISSION/RECEPTION METHOD, DISPLAY DEVICE, AND DECODING DEVICE

RELATED APPLICATIONS

This application is the U.S. National Phase under 35 U.S.C. §371 of International Application No. PCT/JP2011/005963, filed on Oct. 26, 2011, the disclosure of which Application is incorporated by reference herein.

TECHNICAL FIELD

The technical field relates to transmission or reception of video information.

RELATED ART

Patent Literature 1 discloses that the problem is "to allow easy determination of whether a predetermined external device coupled through a first transmission path is coupled through a second transmission path" (see Patent Literature 1, [0007]), and that means for solving the problem "includes a first identification information acquisition unit configured to acquire identification information of an external device coupled through a first transmission path, a second identification acquisition unit configured to acquire identification information of an external device coupled through a second transmission path, and a coupling determination unit configured to determine whether a predetermined external device selected by the external device coupled through the first transmission path is coupled through the second transmission path, by comparing the identification information of the external device acquired by the first identification information acquisition unit with the identification information acquired by the second identification information acquisition unit" (Patent Literature 1, [0008]); and the like.

CITATION LIST

Patent Literature

PTL 1: Japanese Unexamined Patent Application Publication No. 2009-284403

SUMMARY OF INVENTION

Technical Problem

Patent Literature 1 discloses the method for easily determining whether the predetermined external device coupled through the first transmission path is also coupled through the second transmission path.

However, Patent Literature 1 gives no consideration to a method for, when an operation requested through the second transmission path (or first transmission path) cannot be performed, performing the requested operation.

Solution to Problem

To solve the above problem, for example, the configurations described in the claims are employed.

The present application includes multiple means for solving the above problem. One of the means is a method by which first, second, and third devices transmit or receive a video signal, the first, second, and third devices being coupled together through a network, the first and second devices being coupled together through a first network, the first and third devices being coupled together through the second network, and the second and third devices being coupled together through the second network. The method includes: when the first device cannot process a video signal received from the third device through the second network, a step of receiving, by the second device, the video signal from the third device through the second network; a step of processing, by the second device, the received video signal; and a step of transmitting, by the second device, the processed video signal to the first device through the first network.

Advantageous Effects of Invention

According to the above means, even when the operation requested through the second transmission path (or first transmission path) cannot be performed, it is possible to perform the requested operation by using the function of the device coupled to the first transmission path (or second transmission path).

BRIEF DESCRIPTION OF THE DRAWINGS

FIG. 4 is a block diagram showing an example configuration of an STB.

FIG. 6 is a diagram showing an example configuration of software of the recorder.

FIG. 17(a) is a diagram showing an example of the definition of a substitute search message.

FIG. 17(b) is a diagram showing an example of a vendor definition instruction of a CEC message.

FIG. 17(c) is a diagram showing an example of the definition of a parameter [Vendor Opcode].

FIG. 17(d) is a diagram showing an example of the definition of a parameter [search function].

FIG. 17(e) is a diagram showing an example of the header of a CEC message.

FIG. 17(f) is a diagram showing an example of the definition of a message <Vendor Command>.

FIG. 18(a) is a diagram showing an example of the definition of a substitute request message.

FIG. 18(b) is a diagram showing an example of the definition of a substitute result report message.

FIG. 18(c) is a diagram showing an example of the definition of a parameter [Result].

FIG. 19(a) is a diagram showing an example configuration of a network device search message.

FIG. 19(b) is a diagram showing an example configuration of a network device search response message.

FIG. 19(c) is a diagram showing an example configuration of a network device search message.

DESCRIPTION OF EMBODIMENTS

Figure 1:
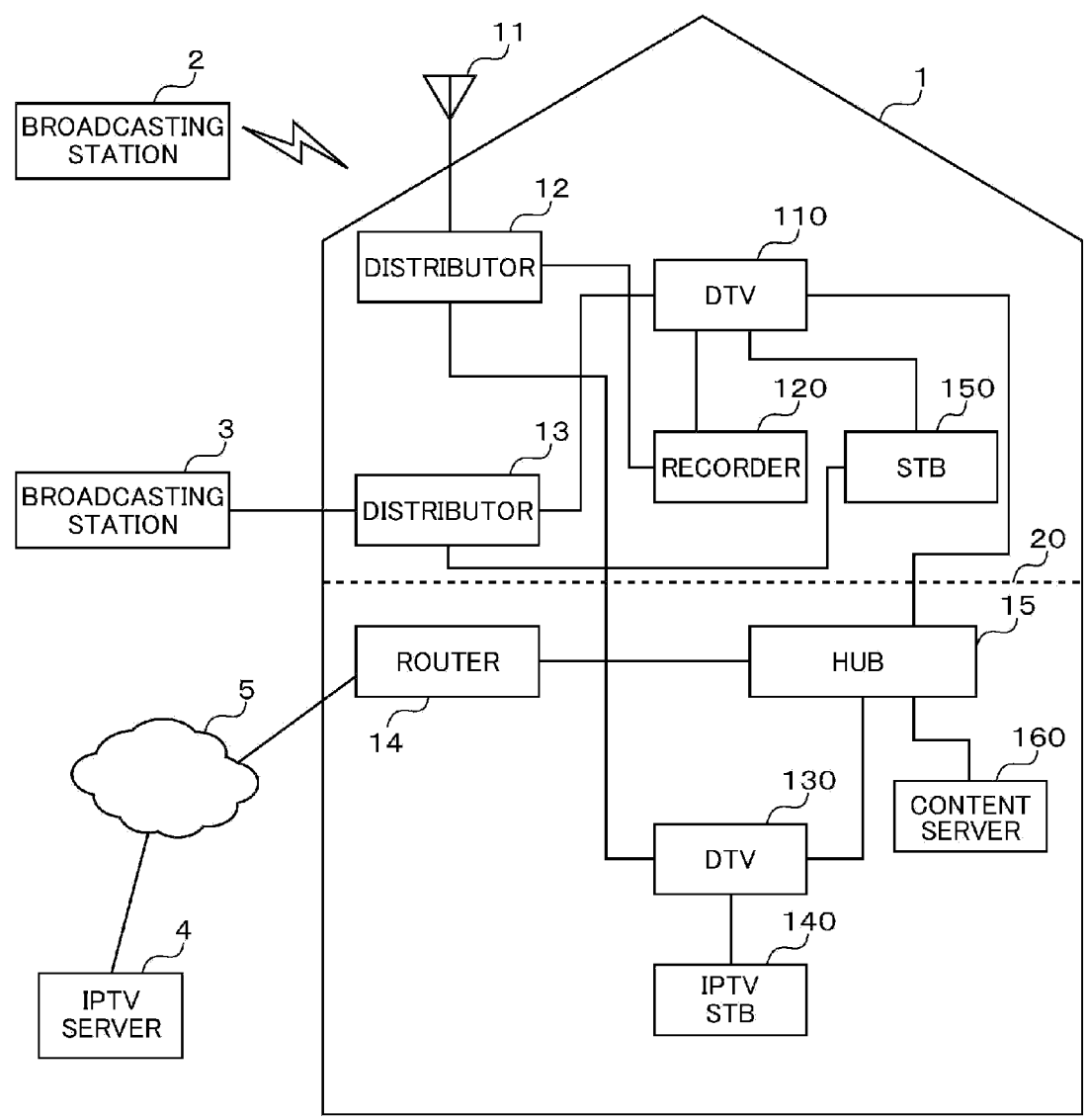
FIG. 1 is a block diagram showing an example configuration of a system.

Hereafter, embodiments will be described using the drawings. In the drawings, the same reference signs designate the same or equivalent components. The present invention is not limited to the embodiments.

[First Embodiment]

In the present embodiment, there will be described substitute user-provided function performance, where if a function provided to the user by a first network (user-provided function) cannot be performed in the first network, this function is performed in a second network alternatively.

In the present embodiment, assuming that the first network is a High-Definition Multimedia Interface (HDMI) (registered trademark) network and that the second network is a Digital Living Network Alliance (DLNA) (registered trademark) network, there will be described an example where when a user-provided function provided by the HDMI network serving as the first network cannot be performed in the HDMI network, this function is performed in the DLNA network serving as the second network alternatively.

FIG. 1 is an example of the system configuration of the present embodiment. Reference sign 1 represents a user's home; reference signs 2 and 3 broadcasting stations; reference sign 4 an IPTV server; and reference sign 5 an external network.

In the present embodiment, the broadcasting stations 2 and 3 make broadcasts using different broadcasting systems. Hereafter, there will be described an example where the broadcasting station 2 makes terrestrial digital broadcasts using ground waves and where the broadcasting station 3 makes digital cable television (CATV) broadcasts. The broadcasting systems of the broadcasting stations 2 and 3 may be of any type, as long as the broadcasting systems differ from each other. For example, a combination of BS digital broadcasting, which is performed using satellite waves, and CATV broadcasting may be used.

In the user's home 1, reference sign 11 represents a broadcast receiving antenna 11; reference signs 12 and 13 distributors; reference sign 14 a router; reference sign 15 a hub; reference signs 110 and 130 digital televisions (DTV); reference sign 120 a recorder; reference sign 140 an IPTV set-top box (IPTV STB); reference sign 150 a set-top box (STB); and reference sign 160 a content server. The recorder 120 and the DTV 130 have the function of receiving terrestrial digital broadcasts receiving terrestrial digital broadcasts transmitted by the broadcasting station 2. The DTV 110 and the STB 150 have the function of receiving CATV broadcasts. The IPTV STB 140 has the function of receiving or downloading content delivered by the IPTV server 4 through an external network.

Reference sign 20 represents a boundary in the user's home 1. The portion under the boundary 20 represents a room on the first floor of the user's home 1, and the portion over the boundary 20 represents a room on the second floor. The broadcast receiving antenna 11 receives a terrestrial digital broadcast made by the broadcasting station 2. The received digital broadcast is distributed to the recorder 120 and the DTV 130 by the distributor 12. A CATV broadcast made by the broadcasting station 3 is distributed to the DTV 110 and the STB 150 by the distributor 13.

In the user's home 1, the DTV 110 and the recorder 120 are coupled together through a HDMI cable, forming an HDMI network (first network). The DTV 130 and the IPTV STB 140 are also coupled together through an HDMI cable, forming an HDMI network (first network, part 2) which is independent of the HDMI network formed by the DTV 110 and the recorder 120.

The DTV 110, the DTV 130, and the content server 160 are coupled to the hub 15, forming a DLNA network (second network).

In the present embodiment, HDMI provides the HDMI Ethernet Channel (HEC) function of transmitting a bi-directional Ethernet® signal. The recorder 120 and the STB 150 are coupled to the hub 15 through the HDMI-coupled DTV 110, serving as devices forming the DLNA network. Similarly, the IPTV STB 140 is coupled to the hub 15 through the DTV 130, serving as a device forming the DLNA network. The devices coupled to the hub 15 can be coupled to an external network through the router 14.

The recorder 120, the STB 150, the IPTV STB 140, and the content server 160 have the Digital Media Server (DMS) function of making content information open to the network and delivering content, as well as operate as HDMI source devices.

The DTV 110 and the DTV 130 have, in the DLNA network, the Digital Media Player (DMP) function of viewing content information made public by the DMS, searching for the desired content, and displaying the content and the Digital Media Controller (DMC) function of controlling copy or transfer of content from a device having the DMS function in the network to a device having a recording function, as well as operate as HDMI sink devices.

Figure 2:
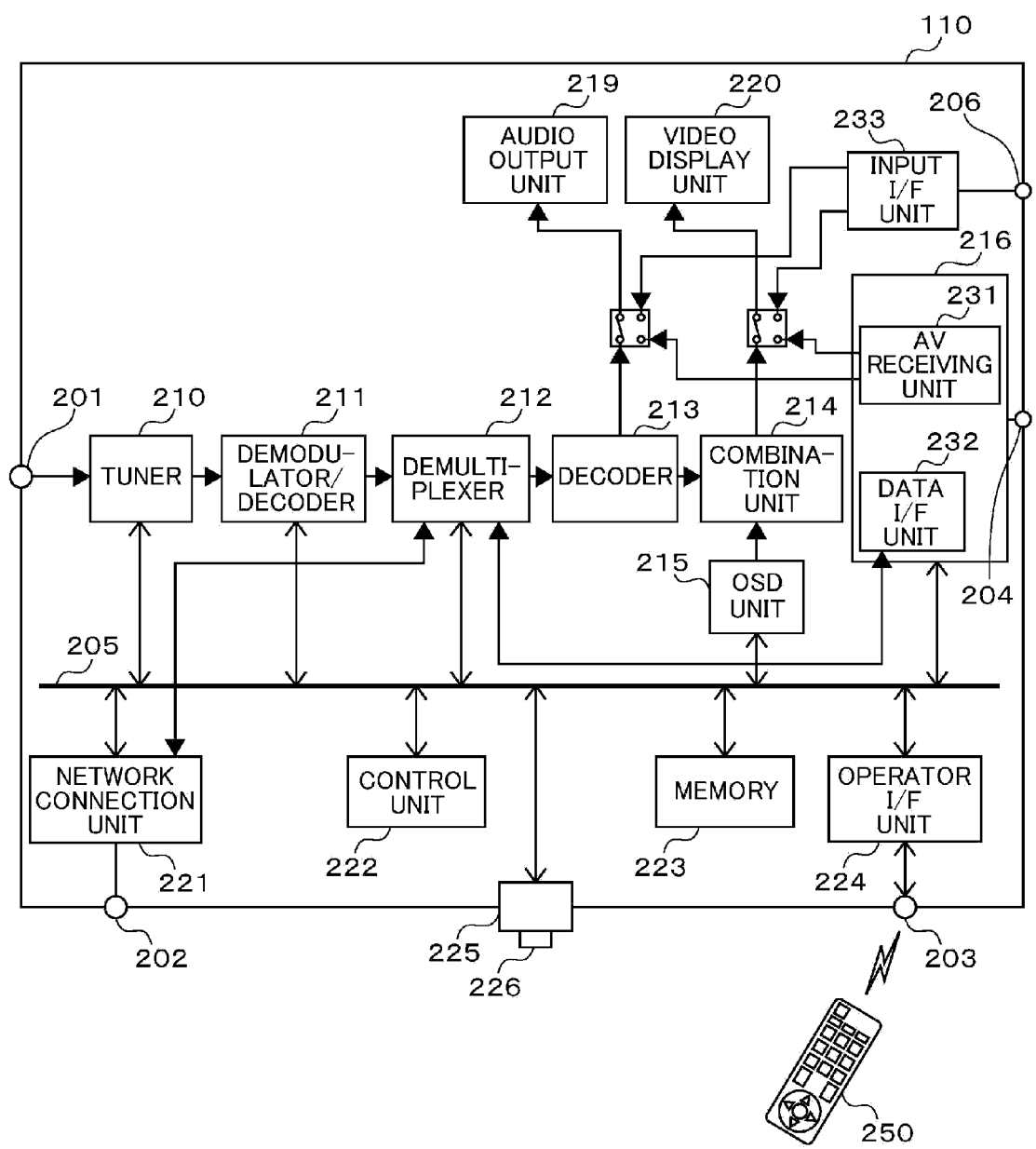
FIG. 2 is a block diagram showing an example configuration of a DTV.

FIG. 2 is a block diagram showing an example configuration of the DTV 110 of the present embodiment. The DTV 110 includes an antenna coupling terminal 201, a network terminal 202, an operation signal receiver 203, input terminals 204 and 206, a system bus 205, a tuner 210, a demodulator/decoder 211, a demultiplexer 212, a decoder 213, a combination unit 214, an OSD unit 215, input I/Fs 216 and 233, switches 217 and 218, an audio output unit 219, a video display unit 220, a network coupling unit 221, a control unit 222, a memory 223, an operation I/F 214, a limited reception I/F 225, and a limited reception information storage unit 226.

Reference sign 250 represents an operation device which the user uses to operate the DTV 110. A remote controller, mouse, keyboard, touchscreen, or the like is used. A smartphone or tablet terminal may also be used.

A broadcast signal is inputted to the tuner 210 through the antenna coupling terminal 201. The tuner 210 extracts the frequency band of a channel to be received, obtains a baseband signal by quadrature demodulation, and outputs the baseband signal to the demodulator/decoder 211. The demodulator/decoder 211 decodes the baseband signal into a digital broadcast signal, for example, by performing synchronous demodulation on the baseband signal using 8 Phase Shift Keying (PSK) and then performing error correction such as Viterbi decoding or Reed-Solomon (RS) decoding, and then outputs the digital broadcast signal to the demultiplexer 212. The present embodiment describes a case where an MPEG2-TS signal, which is compression-encoded using the Moving Picture Experts Group (MPEG) system and multiplexed using the Transport Stream (TS) system, is used as a digital broadcast signal.

The demultiplexer 212 separates and extracts a signal to be used subsequently from the multiplexed MPEG2-TS signal. The demultiplexer 212 then acquires key information or the like stored in the limited reception information storage unit 226 through the limited reception I/F 225, descrambles the MPEG2-TS signal scrambled to protect copyright, using this information, and outputs video and audio signals forming content such as a broadcasting program, packetized elementary streams (PESs) or elementary streams (ESs), which are the signal streams of captions, or data of a data broadcast or the like.

The decoder 213 decodes the PESs or ESs of the video and audio signals separated and extracted by the demultiplexer 212 into uncompressed video and audio signals. The decoded audio signals are outputted to the switch 217. The decoded video signals are outputted to the combination unit 214.

The combination unit 214 combines the video signals received from the decoder 213 and an OSD received from the OSD unit 215 to form a display screen and then outputs the display screen to the switch 218.

The OSD unit 215, under the control of the control unit 222, generates an OSD such as a user interface (UI) screen for a user operation or a message dialog for notifying the user of the state of the operation and then outputs the OSD to the combination unit 214.

The input I/F 216 includes an AV receiver 231 and a data I/F 232. The AV receiver 231 receives video signals, audio signals, and auxiliary data inputted from outside through an input terminal 204. The AV receiver 231 outputs the video signals to the switch 218 and outputs the audio signals to the switch 217. The auxiliary data is data related to the inputted video and audio signals, such as the formats thereof. The auxiliary data is outputted to the control unit 222 through the system bus 205 and then used for purposes such as display control of the video signals.

The data I/F 232 bi-directionally performs data communication with another device which is coupled thereto through the input terminal 204. Data inputted to the data I/F 232 is processed by the control unit 222. Also, under the control of the control unit 222, data is transmitted to the other device. In the present embodiment, a Consumer Electronics Control (CEC) message or bi-directional Ethernet signal, which the devices use to operate each other, is transmitted through the HDMI network (first network).

An input I/F 233 has a similar configuration and functions to those of the input I/F 216.

The switch 217 switches an audio signal to be outputted to the audio output unit 219; the switch 218 switches a video signal to be outputted to the video display unit 220. The switches 217 and 218 are controlled by the control unit 222 as to whether to output video and audio signals inputted from outside through the input terminal 204 or 206 or to output video and audio signals generated by the decoder 213.

The audio output unit 219 is a speaker or the like for outputting the audio signals received through the switch 217. The video display unit 220 displays the video signals received through the switch 218 on a display panel such as a liquid crystal display.

The network coupling unit 221 includes a communication processing unit and a transmission content protection unit. Through the network terminal 202, it transmits or receives data or content to or from the other devices coupled to the hub 15, the outside server coupled to a network 5, or the like. The communication processing unit interprets the communication protocol or controls the flow of communication data. The transmission content protection unit authenticates devices in accordance with copyright protection applied to content, encrypts content to be outputted to the network, or decrypts content received from the network.

The control unit 222 runs the operating system (OS) or applications or causes the DTV 110 to function.

The memory 223 includes a volatile memory and a non-volatile memory. The non-volatile memory stores software for operating DTV 110, such as the OS and applications. The volatile memory temporarily stores data or the like necessary to run the software.

The operation I/F 224 processes an input signal from the operation device 250 which is received by the operation signal receiver 203. The operation device 250 is, for example, a remote controller, mouse, keyboard, touchscreen, or the like. The operation signal receiver 203 may wirelessly receive an input signal from the operation device 250 using infrared rays or the like, or may connect to the operation device 250 coupled through a coupling terminal to receive an input signal.

The system bus 205 is a data bus coupled to the components of the DTV 110 (some of the coupling lines are omitted). The components use the system bus 205 to communicate a control signal or data signal to each other.

The limited reception I/F 225 is an interface coupled to the limited reception information storage unit 226. The limited reception information storage unit 226 stores key information or the like for descrambling.

The DTV 110 includes a layer 2 switch (not shown). The layer 2 switch has the function of transferring a MAC frame, which is an Ethernet data frame. MAC frames inputted to the input terminals 204 and 206 and the network terminal 202 are transferred in accordance with the destination addresses. Owing to the layer 2 switch, the devices coupled to the input terminals 204 and 206 are coupled to the hub 15, serving as devices forming the DLNA network (second network), as well as can be coupled to the external network 5. Note that when the layer 2 switch receives a limited multicast message having a limited HEC function, it transfers the message only to the input terminals 204 and 206 and not to the network terminal 202.

While the configuration of the DTV 110 has been described above, the DTV 130 also has a similar configuration to that of the DTV 110.

Figure 3:
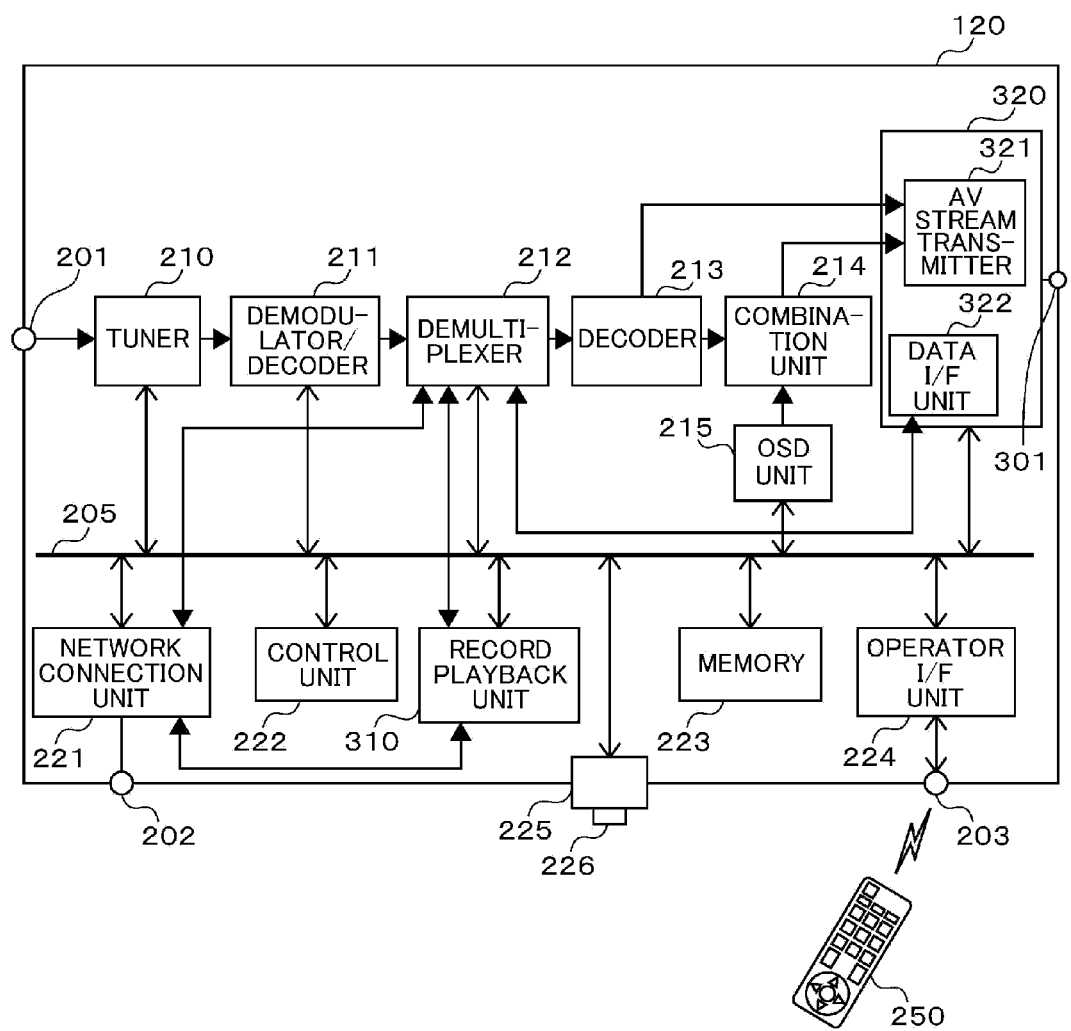
FIG. 3 is a block diagram showing an example configuration of a recorder.

FIG. 3 is a block diagram showing an example configuration of the recorder 120 of the present embodiment. Components of FIG. 3 similar to those of FIG. 2 are given the same reference signs and will not be described. The recorder 120 differs from the DTV 110 in that it includes a record generation unit 310, that it includes an output terminal 301 in place of the input terminals and includes an output I/F 320 in place of the input I/F, and that it does not include the video output unit, audio output unit, or switches.

The record playback unit 310 includes a recording medium and an encryption/decryption unit. It performs processes such as the recording process of writing content, such as a received broadcasting program, or content obtained through the network to a storage medium, the playback process of reading recorded content from the storage medium and outputting it, and the process of deleting recorded content. In recording content on the storage medium, the encryption unit properly encrypts the content. In reading content from the storage medium, the decryption unit decrypts the content encrypted when recorded and then outputs it. The storage medium includes one or both of a built-in storage medium such as a hard disk and a detachable storage medium such as an optical disk, removable hard disk, or memory card. The storage medium may include several types of storage media such as a hard disk, an optical disk, and a memory card.

The output I/F 320 includes an AV transmitter 321 and a data I/F 322. The AV transmitter 321 transmits video signals, audio signals, and auxiliary data through the output terminal 301. The auxiliary data is data related to the video and audio signals to be outputted, such as the formats thereof. The data I/F 322 is similar to the data I/F 232.

The AV transmitter 321 outputs a broadcasting program received by the recorder 120 or audio and video signals corresponding to content recorded or played back by the record generation unit 310, along with auxiliary data.

FIG. 4 is a block diagram showing an example configuration of the STB 150 of the present embodiment. Components of FIG. 4 similar to those of FIGS. 2 and 3 are given the same reference signs and will not be described. The STB 150 differs from the recorder 120 in that it does not include the record generation unit 310.

In the system configuration diagram of FIG. 1, the output terminal 301 of the recorder 120 and the input terminal 204 (or 206) of the DTV 110, and an output terminal 301 of the STB 150 and the input terminal 204 (or 206) of the DTV 110 are coupled together, respectively, through HDMI cables. Thus, the HDMI network (first network) is formed.

Note that in the system configuration diagram of FIG. 1, none of the network terminal 202 of the recorder 120 and a network terminal 202 of the STB 150 is used. Owing to the function of the layer 2 switch of the recorder 120, the recorder 120 and the STB 150, which are coupled to the input terminals 204 and 206 through the HDMI cables, also serve as devices forming the DLNA network (second network), as well as can be coupled to the external network 5.

The data I/F 232 of the recorder 120, a data I/F 322 of the network terminal 202, and a data I/F 322 of the STB 150 have the HEC function of the HDMI and capability to transmit or receive an Ethernet data frame.

Figure 5:
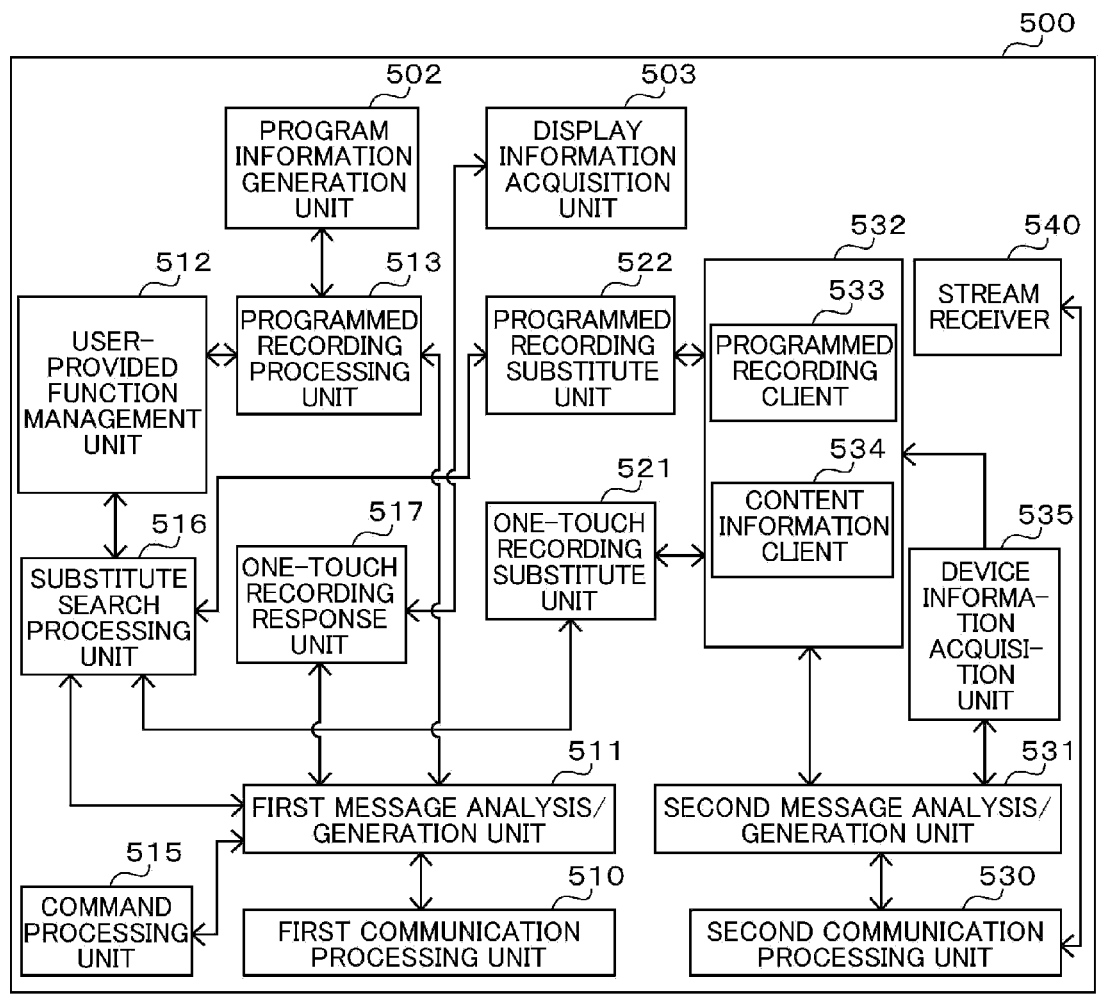
FIG. 5 is a diagram showing an example configuration of software of a DTV.

FIG. 5 is a diagram showing an example configuration of software of the DTV 110. Control software 500 for performing the functions of the DTV 110 is loaded into the memory 223 of the DTV 110 and then executed by the control unit 222.

The control software 500 includes a program information generation unit 502, a display information acquisition unit 503, a first communication processing unit 510, a first message analysis/generation unit 511, a user-provided function management unit 512, a programmed recording processing unit 513, a command processing unit 515, an substitute search processing unit 516, a one-touch recording responding unit 517, an one-touch recording substitute unit 521, an programmed recording substitute unit 522, a second communication processing unit 530, a second message analysis/generation unit 531, a DMC unit 532, a programmed recording client 533, a content information client 534, a device information acquisition unit 535, and a stream receiver 540. The control software 500 may include a system standby processing unit (not shown).

The program information generation unit 502 generates content information of a program selected using the tuner 210 and being received and records the content information in the memory 233. The content information refers to, for example, property information such as an identifier for uniquely determining the content (content ID), the type of the content, or data format and program information such as the title, category, copy control information, or event ID. The program information generation unit 502 generates the property information of the content information on its own and acquires the program information thereof from a PES or ES including information about the broadcasting program separated and extracted by the demultiplexer 212. The type of the content refers to video, voice, image, or the like, and the data format refers to the encoding system of the content such as Moving Picture Experts Group (MPEG) or MPEG Audio Layer-3 (MP3).

The display information acquisition unit 503 provides content information of the content being displayed on the video display unit 220.

The first communication processing unit 510 processes communication data in accordance with the communication protocol when the DTV 110 transmits or receives content or a control message to or from the other devices in the first network.

The first message analysis/generation unit 511 interprets a message, such as a control request, generated in accordance with the predetermined format of signals transmitted or received between the devices in the first network and then distributes the message to a processing unit for processing requested control. The first message analysis/generation unit 511 also generates a response to a control request from another device which is generated by the processing unit, or a control request to another device in the form of a message according to the predetermined format used by the devices in the first network.

The user-provided function management unit 512 manages performance of the functions which are provided to the user by the first network (user-provided functions). Specifically, the user-provided function management unit 512 detects that the user has operated the remote controller or made a selection on the menu, determines a user-provided function requested by the user, and requests the corresponding user function processing unit (the configuration to realize the requested user-provided function) to perform the processing. If the user function processing unit cannot perform the requested user-provided function, the user-provided function management unit 512 requests the substitute search processing unit 516 to alternatively perform the function.

The programmed recording processing unit 513 is one of user function processing units for performing the user-provided functions provided to the user by the first network. The programmed recording processing unit 513 provides the user with a "programmed recording function." The "programmed recording function" refers to the function of programming and recording, in the recorder coupled to the DTV through the first network, a program selected based on an electronic program list (EPG) which is running on the DTV. In the system configuration of FIG. 1, when the DTV 110 is requested to perform the "programmed recording function," it sets programmed-recording of a selected program on the recorder 120.

The system standby processing unit (not shown) is also one of the user function processing units for performing the user-provided functions provided to the user by the first network. The system standby processing unit provides the user with a "system standby function." The "system standby function" is the function of, when the user requests power-off by operating the remote controller or the like, placing all the devices coupled to the DTV through the first network in standby mode. In the system configuration of FIG. 1, when the DTV 110 is requested to perform the "system standby function," the recorder 120 and the STB 150 are also placed in standby mode in conjunction with the DTV 110.

As one example, FIG. 5 shows user function processing units corresponding to the "programmed recording function" and the "system standby function." If other user-provided functions are provided, user function processing units for performing the respective user-provided functions are provided.

The command processing unit 515 processes a single control command which is not a command to perform a "user-provided function." A single control command is, for example, <Give Device Power Status> to refer to the power supply state of the device, <Set OSD String> to display a message on an OSD, or the like.

The substitute search processing unit 516 searches for a device which provides a substitute feature to alternatively perform the user-provided function that the user-provided function management unit 512 has been requested to perform, and then requests a found device to alternatively perform the function. The substitute search processing unit 516 also manages substitute features which can be provided and, upon receipt of a message searching for a substitute feature, makes a response to the message.

The one-touch recording responding unit 517 is one of user function responding units. Each user function responding unit makes a response to a control message related to a "user-provided function" transmitted by a device which performs the user-provided function. The one-touch recording responding unit 517 makes a response to a control message related to the "one-touch recording function."

As one example, FIG. 5 shows a user function responding unit for making a response to a request to perform the "one-touch recording function." To provide response processing to other user-provided functions, the control software 500 includes the function responding units as user-provided function responding units for the respective user-provided functions.

The one-touch recording substitute unit 521 is one of substitute user function units which alternatively perform the function of a user function processing unit using the functions of the second network. The one-touch recording substitute unit 521 performs the "one-touch recording function" using the network functions provided by the devices coupled to the second network. The one-touch recording substitute unit 521 searches the second network for a DMS which delivers content whose recording has been requested using the "one-touch recording function" and then instructs the recorder which has requested substitute performance of the "one-touch recording function" to acquire the content from the found DMS and record (download) it.

The programmed recording substitute unit 522 is one of the substitute user function units, which alternatively perform the functions of the user function processing units using the functions of the second network. The programmed recording substitute unit 522 performs the "programmed recording function" using the network functions provided by the devices coupled to the second network.

As one example, FIG. 5 shows substitute user function units corresponding to the "one-touch recording function" and the "programmed recording function." To alternatively perform other user-provided functions, the control software 500 needs to include substitute user function units for alternatively performing the respective user-provided functions.

The second communication processing unit 530 processes communication data in accordance with the communication protocol when the DTV 110 transmits or receives content or a control message to or from the other devices in the second network.

The second message analysis/generation unit 531 interprets a message, such as a control request, generated in accordance with the predetermined format of signals transmitted or received between the devices in the second network and then distributes the control request or a response to a control request to a service or client for processing the control request or the like. The second message analysis/generation unit 511 also generates a response to a control request from another device which is generated by the processing unit, or a control request to another device in the form of a message according to the predetermined format used by the devices in the second network. As used herein, a service refers to a function provided to the other devices in the second network. A client refers to the function of using a service. In the present embodiment, the DTV 110 operates as a DMC for controlling the other devices in the second network and therefore has no service.

A message that the second message analysis/generation unit 631 transmits or receives is transmitted or received to or from another device in accordance with a proper communication protocol through a network communication processing unit 420. The communication protocol is HTTP GET, Real-time Transport Protocol (RTP), or the like.

The DMC unit 532 has a content information client 534 for acquiring information about content provided in the first network and a programmed recording client 533 for setting programmed recording on the other devices in the first network. The DMC unit 532 provides the user with the DMC function of viewing content through the first network and setting programmed recording on the recorder in the network.

The programmed recording client 533 sets registration or cancellation of programmed recording on another device which provides programmed recording service or acquires programmed recording list information or the like through the first network.

The content information client 534 acquires content information provided by a content information service and then shows it to the user. When the user selects content to be viewed, the content information client 534 requests the stream receiver 540 to acquire the content selected.

When the device information acquisition unit 535 detects a notification indicating that another device has been coupled to the network or decoupled therefrom and detects that the device to be controlled has been coupled to the network, it transmits a request message requesting device description information or service detail information to the device information providing service of the detected device. The device information acquisition unit 535 then records the acquired device description information or service detail information in the memory 223 in a form which can be referred to using a network ID, device type, or the like. The device information acquisition unit 535 also records coupling state management information, including the coupling state information indicating the coupling state of the device and update time information (the value indicating the date and time when the device has been coupled or decoupled), in a form which can be referred to using a network ID with which the device can be identified, or the like.

When necessary, the device information acquisition unit 535 transmits a device search request to search for the desired device to be controlled in the home network. When the device information acquisition unit 535 detects a notification indicating that a device has been decoupled, it updates the coupling state to a value indicating decoupling and updates the update time information to the time when it has detected the decoupling notification. The device information acquisition unit 535 may delete the device description information or service detail information of the decoupled device when it has detected the decoupling or after a predetermined time (24 hours or the like) has elapsed since the decoupling.

The stream receiver 540 accesses a URL described in information to be accessed of content information of the content that the stream receiving unit 540 has been requested to acquire by the content information client 534, and then acquires the stream of the content. The acquired stream of the content is outputted to the demultiplexer 212 and separated and extracted, then decoded by the decoder 213, and then outputted to the audio output unit 219 and the video display unit 220.

FIG. 6 is a diagram showing an example configuration of software of the recorder 120.

Control software 600 for performing the functions of the recorder 120 is loaded into the memory 223 of the recorder 120 and then executed by the control unit 222 thereof.

The control software 600 includes a program information generation unit 602, a content management unit 603, a programming setting management unit 604, a first communication processing unit 610, a first message analysis/generation unit 611, a user-provided function management unit 612, a command processing unit 615, an substitute search processing unit 616, a one-touch recording processing unit 621, a programmed recording responding unit 625, a second communication processing unit 630, a second message analysis/generation unit 631, a DMS unit 632, a programmed recording service 633, a content information service 634, a device information providing service 635, and a stream transmitter 640.

The program information generation unit 602 generates content information of a program selected using the tuner 210 and being received and records the content information in the memory 233 or record playback unit 310. As used herein, content information refers to, for example, property information, such as an identifier for uniquely determining the content (content ID), the type of the content, data format, or information to be accessed (URI: Uniform Resource Identifier) when providing the content to the network, and program information such as the title, category, copy control information, or event ID.

The program information generation unit 602 generates the property information of the content information on its own and acquires the program information thereof from a PES or ES including information about the broadcasting program separated and extracted by the demultiplexer 212. The type of the content refers to video, voice, image, or the like, and the data format refers to the encoding system of the content, such as Moving Picture Experts Group (MPEG) or MPEG Audio Layer-3 (MP3).

In recording content in the record playback unit 310, the content management unit 603 generates content information of the content and records the content information in the memory 233 or record playback unit 310. The content information includes the property information generated by the program information generation unit 602, as well as information such as the file name, size, or recording date/time.

If content to be recorded is a broadcasting program, the content management unit 603 acquires content information thereof from a PES or ES including information of the broadcasting program separated and extracted by the demultiplexer 212. For content acquired through the network, it acquires content information thereof from the source of the content. The content management unit 603 also associates content with content information thereof, updates the content information when the content is deleted or transferred, manages the frequency with which content having a copy frequency limit is copied, and performs other processes. The content management unit 603 also generates an UI for showing a list of content recorded based on content information and shows the UI to the user. The content management unit 603 also plays back, copies, or transfers content selected by the user in accordance with an instruction of the user.

The programming setting management unit 604 accepts programmed recording or viewing that the user sets by operating the electronic program list or the like, or programmed recording set by the programmed recording service 633 or the like and manages the programming information. It records the programming information in the memory 223 or record playback unit 310. The programming setting management unit 604 also monitors the start time of the programmed program and makes proper settings as to selection of a program by the tuner 210. For programmed recording, it also make settings as to performance of programmed recording, for example, by making settings so that the demultiplexer 212 outputs a stream forming content such as a broadcasting program to the record playback unit 310. The programming setting management unit 604 also receives a request to record a broadcasting program being received currently and then makes proper settings as to the output of the demultiplexer 212, or the like.

The first communication processing unit 610 processes communication data in accordance with the communication protocol when transmitting or receiving content or a control message to or from the other devices in the first network.

The first message analysis/generation unit 611 interprets a message, such as a control request, generated in accordance with the predetermined format of signals transmitted or received between the devices in the first network and then distributes the message to a processing unit which processes requested control. It also generates a response to a control request from another device generated by the processing unit or a control request to another device in the form of a message according to the predetermined format used by the devices in the first network.

The user-provided function management unit 612 manages performance of the functions which are provided to the user by the first network (user-provided functions). Specifically, the user-provided function management unit 612 detects that the user has operated the remote controller or made a selection on the menu, determines a user-provided function requested by the user, and requests the corresponding user function processing unit to perform processing. If the user function processing unit cannot perform the requested user-provided function, the user-provided function management unit 612 requests the substitute search processing unit 616 to alternatively perform the function.

The command processing unit 615 processes a single control command which is not a command to perform a "user-provided function." As used herein, a single control command is, for example, <Give Device Power Status> to refer to the power supply state of the device, <Set OSD String> to display a message on an OSD, or the like.

The substitute search processing unit 616 searches for a device which provides an substitute feature to alternatively perform the user-provided function that the user-provided function management unit 612 has been requested to perform, and then requests a found device to alternatively perform the function. The substitute search processing unit 516 also manages substitute features which can be provided and, upon receipt of a message searching for a substitute feature, makes a response to the message.

The one-touch recording processing unit 621 is one of the user function processing units for performing the user-provided functions provided to the user by the first network. The one-touch recording processing unit 621 provides the user with the "one-touch recording function." The "one-touch recording function" refers to the function of, when the user instructs the recorder to perform recording, for example, by operating the remote controller, recording content being displayed on the DTV coupled to the recorder through the first network, in the recorder. In the system configuration of FIG. 1, when the recorder 120 is requested to perform the "one-touch recording function," the recorder 120 records content being displayed on the DTV 110.

As one example, FIG. 5 shows a user function processing unit corresponding to the "one-touch recording function." If other user-provided functions are provided, user function processing units for performing the respective user-provided functions are provided.

The programmed recording responding unit 625 is one of user function responding units. The programmed recording responding unit 625 makes a response to a control message related to the "programmed recording function."

The second communication processing unit 630 processes communication data in accordance with the communication protocol when the recorder 120 transmits or receives content or a control message to or from the other devices in the second network.

The second message analysis/generation unit 631 interprets a message, such as a control request, generated according to the predetermined format of signals transmitted or received between the devices in the second network, and then distributes the control request or a response to the control request to a service or client which processes them. The second message analysis/generation unit 631 also generates a response to a control request from another device, or a control request to another device in the form of a message according to a predetermined format used by the devices on the second network. As used herein, a service refers to a function provided to the other devices in the second network. A client refers to the function of using a service. In the present embodiment, the recorder 120 operates as a DMS for making content information open to the second network and providing a content delivery service, and therefore has no client.

The DMS unit 632 includes a content information service 634 for providing information of content provided to the second network and a programmed recording service 633 which allows the other devices in the second network to set programmed recording. The DMS unit 632 provides the service of sending a broadcasting program received by the recorder 120 or content such as a broadcasting program recorded in the record playback unit 310, to the other devices through the second network.

The programmed recording service 633 sets registration or cancellation of programmed recording through the network on the programming setting management unit 604, or acquires programmed recording list information or the like from the programming setting management unit 604 and provides it.

The content information service 634 provides, with respect to all pieces of content which can be provided to the other devices, metadata information such as the title, category, and information to be accessed indicating the target from which content is acquired. The content information service 634 also acquires metadata information about content recorded in the record playback unit 310 from the content management unit 603 and acquires metadata information about a program being broadcast from the program information generation unit 602.

The device information providing service 635 provides, to the devices, information such as device description information including information about the device itself such as the name of the device, a device identification ID uniquely identifying the device in the first network, or the type of the device, or service detail information including details of information for using a service, such as the command name or argument of a service provided by the device. Further, when the own device is coupled to the first network or decoupled therefrom, the device information providing service 635 transmits a notification to that effect to the first network. It also makes a response to a search for a device from the other devices.

The stream transmitter 640 outputs, in accordance with a request from another device, content such as a broadcasting program received by the program information transmitter 110 or a broadcasting program recorded in the record playback unit 310 through the second communication processing unit 630.

Figure 7:
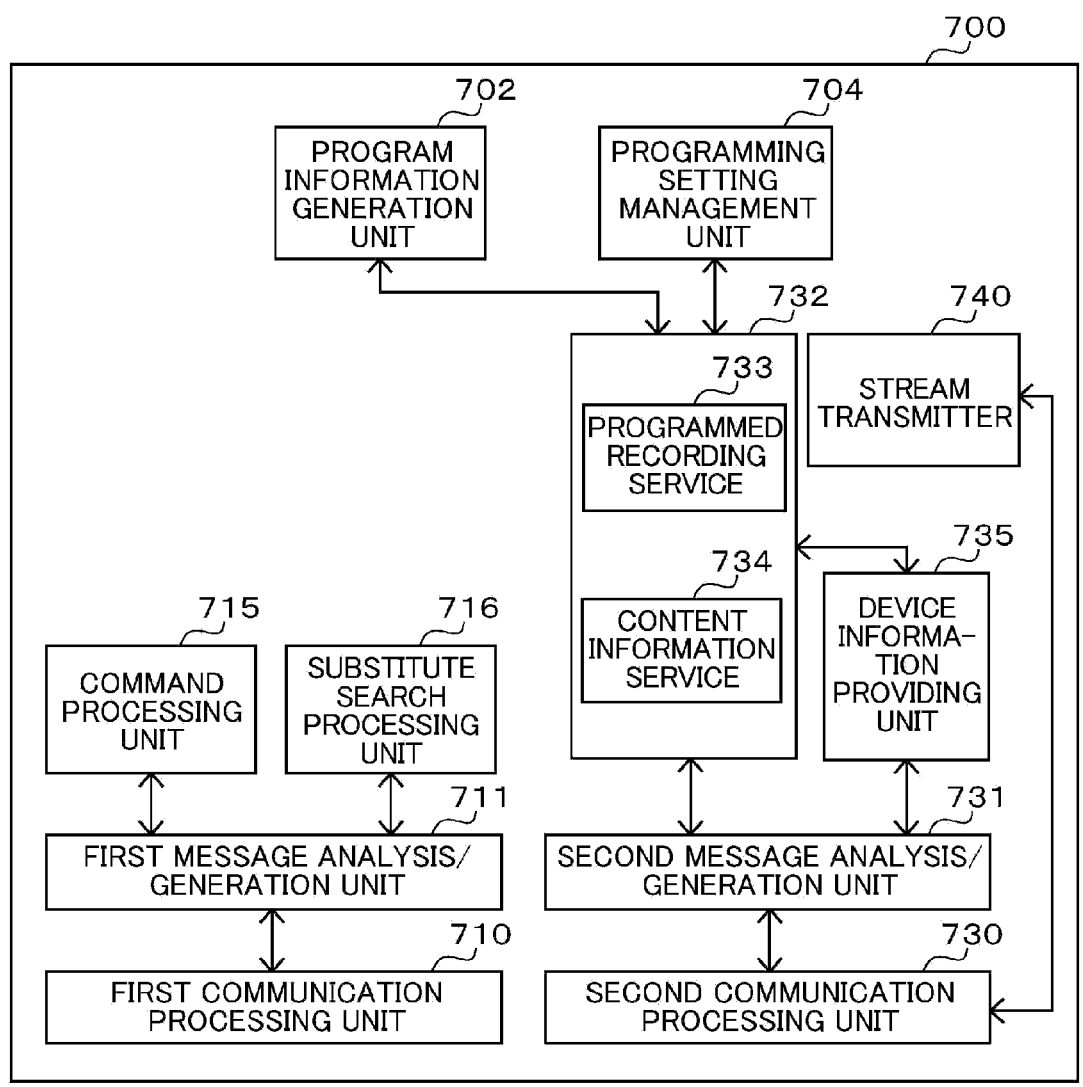
FIG. 7 is a diagram showing an example configuration of software of the STB.

FIG. 7 is a diagram showing an example configuration of software of the STB 150.

Control software 700 for performing the functions of the STB 150 is loaded into the memory 223 of the STB 150 and then executed by the control unit 222 thereof.

The control software 700 includes a program information generation unit 702, a programming setting management unit 704, a first communication processing unit 710, a first message analysis/generation unit 711, a command processing unit 715, an substitute search processing unit 716, a second communication processing unit 730, a second message analysis/generation unit 731, a DMS unit 732, a viewing programming service 733, a content information service 734, a device information providing service 735, and a stream transmitter 740.

The program information generation unit 702 provides a similar function to 602; the first communication processing unit 710 to 610; the first message analysis/generation unit 711 to 611; the command processing unit 715 to 615; the substitute search processing unit 716 to 616; the second communication processing unit 720 to 620; the second message analysis/generation unit 731 to 631; the DMS unit 732 to 632; the device information providing service 735 to 635; and the stream transmitter 740 to 640. For this reason, the respective former components will not be described.

The programming setting management unit 704 receives programmed viewing that the user sets by operating the electronic program list or the like or programmed viewing specified by the viewing programming service 733 or the like and manages the programming information. The programming information is recorded in the memory 223. The programming setting management unit 704 also monitors the start time of a programmed program and makes settings as to performance of programmed viewing, for example, by making proper settings as to selection of a program by the tuner 210.

The viewing programming service 733 sets registration or cancellation of programmed viewing through the network on the programming setting management unit 704, or acquires list information of programs whose viewing is programmed, from the programming setting management unit 704 and provides the information.

Next, specific processes of the present embodiment will be described. In the present embodiment, there will be described an example where the "one-touch recording function," which is one of the user-provided functions of the HDMI network, is alternatively performed. The "one-touch recording function" refers to the function of, when the user requests recording using the operation device 250 (remote controller) of the recorder 120 or the like, recording content being displayed on the DTV 110 coupled to the recorder 120 through the HDMI network, in the recorder 120.

In realizing the "one-touch recording function", if broadcasts receivable by the recorder 120 and broadcasts receivable by the DTV 110 differ from each other in the system configuration shown in FIG. 1, the recorder 120 cannot receive a broadcasting program being displayed on the DTV 110 and therefore cannot perform the "one-touch recording function." Even if the recorder 120 can receive the same programs as the DTV 110 can receive, when the recorder 120 cannot use the tuner thereof since it is performing another recording, it cannot perform the "one-touch recording function."

The present embodiment realize a system which performs the "one-touch recording function" requested by the user even in these cases, by providing an substitute one-touch recording function for alternatively performing the one-touch recording function by using the DLNA network (second network).

Figure 8:
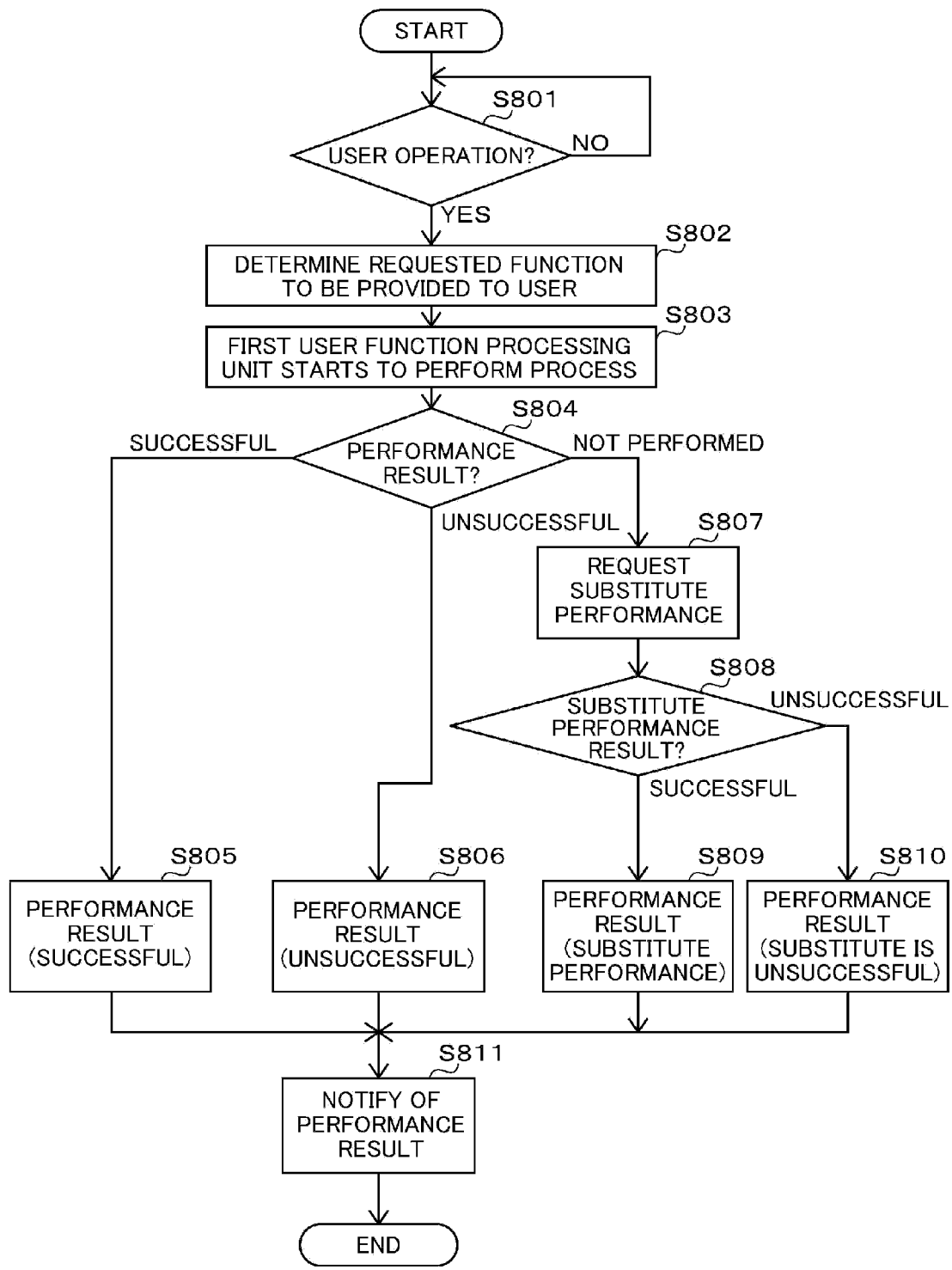
FIG. 8 is a diagram showing an example of the process flow of a user-provided function.

First, the process in which the user-provided function management unit 612 performs a user-provided function will be described using an example shown in FIG. 8. FIG. 8 is an example of a user-provided function performed by the flow of the process of the user-provided function management unit 612. While the process performed by the user-provided function management unit 612 of the recorder 120 will be described as an example hereafter, the user-provided function management unit 512 of the DTV 110 can also perform a similar process.

In S801, the user-provided function management unit 612 waits for user operation to be inputted from the operation device 250.

In S802, the user-provided function management unit 612 identifies the user-provided function requested by the user on the basis of an operation signal, such as a remote control code, transmitted by the operation device 250.

In S803, the user-provided function management unit 612 selects a user function processing unit corresponding to the identified user-provided function to start processing.

In S804, the user-provided function management unit 612 checks the performance result of the function by the user function processing unit. If the user function processing unit has successfully performed the function, the user-provided function management unit 612 proceeds to S805; if the user function processing unit has unsuccessfully performed the function, it proceeds to S806; and if the user function processing unit has not performed the function, it proceeds to S807.

In S805, the user-provided function management unit 612 sets the performance result to "successful" indicating that the user-provided function requested by the user has been performed successfully.

In S806, the user-provided function management unit 612 sets the performance result to "unsuccessful." When the performance result is "unsuccessful," the performance result may include factor information where the cause of "unsuccessful" is represented by an error code or text. If the factor information includes text stating "the selected content is unrecordable content" or the like, the user-provided function management unit 612 can notify the user of the factor of "unsuccessful" by describing, in a performance result notification, the text included in the factor information. The factor information may include both an error code and text.

In S807, the user-provided function management unit 612 requests the substitute search processing unit 616 to alternatively perform the requested user-provided function.

In S808, the user-provided function management unit 612 checks the processing result by the substitute search processing unit 616. If the substitute search processing unit 616 has successfully alternatively performed the function, the user-provided function management unit 612 proceeds to S809; if the substitute search processing unit 616 has unsuccessfully alternatively performed the function, it proceeds to S810. The process performed by the substitute search processing unit 616 will be described later.

In S809, the user-provided function management unit 612 sets the performance result to "alternatively performed" indicating that the user-provided function requested by the user has been alternatively performed.

In S810, the user-provided function management unit 612 sets the performance result to "alternatively unsuccessful" indicating that the user-provided function has been unsuccessfully alternatively performed. As with "unsuccessful," if the performance result is set to "alternatively unsuccessful," the performance result may include factor information where the factor of "unsuccessful" is represented by an error code or text.

In S811, the user-provided function management unit 612 notifies the user of the performance result of the user-provided function requested by the user by generating a dialog screen for notifying the user of the performance result, using the OSD unit and then displaying the dialog screen on the video display unit. Note that the recorder 120, which is a device having no video display unit, displays the message on the DTV coupled to the recorder 120 through the first network by using a single control command <Set OSD String>.

Figure 9:
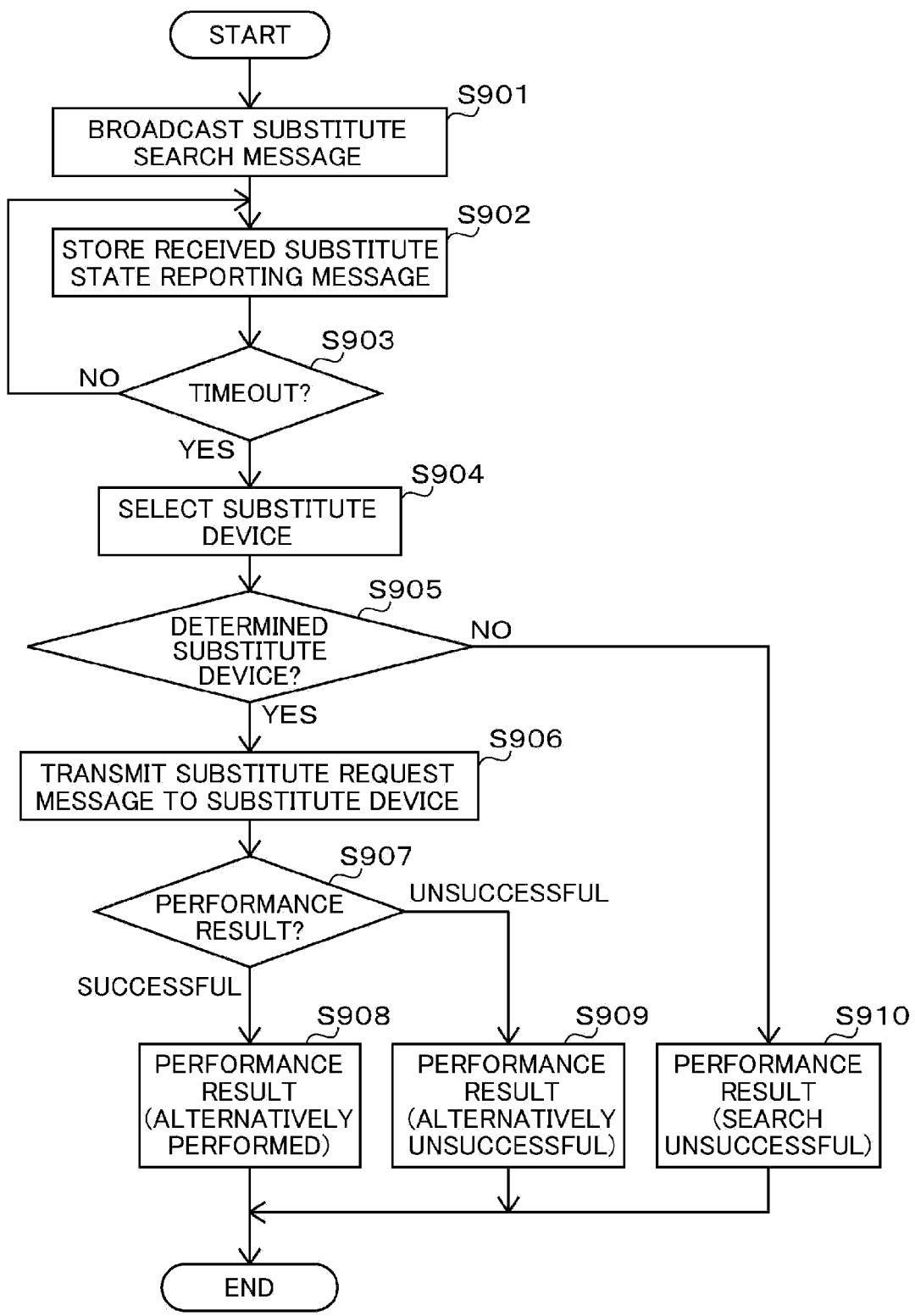
FIG. 9 is a diagram showing an example of the flow of the process of alternatively performing a user-provided function.

Next, there will be described an example of the process in which the substitute search processing unit 616 alternatively performs a user-provided function. FIG. 9 is a diagram showing an example of the flow of the process of alternatively performing a user-provided function. While the process performed by the substitute search processing unit 616 of the recorder 120 will be described hereafter, the substitute search processing unit 516 of the DTV 110 and the substitute search processing unit 716 of the STB 150 can also perform a similar process.

This process starts when the alternate search processing unit 616 is requested to alternatively perform the user-provided function in S807 of FIG. 8. In S901, the substitute search processing unit 616 broadcasts an substitute search message to the HDMI network in order to search for a device having the function of alternatively performing the one-touch recording function among the devices coupled to the HDMI network.

In S902, the substitute search processing unit 616 receives substitute state report messages transmitted by the other devices (responses to the substitute search message transmitted in S901 from the other devices) and stores information about the substitute states of the devices which have made responses, in the memory 223.

In S903, the substitute search processing unit 616 waits for substitute state report messages from the other devices coupled to the HDMI network for a predetermined time (e.g., one second) (a process performed by the other devices will be described later using FIG. 10). When the predetermined time passes and after time out, the substitute search processing unit 616 proceeds to S904. The substitute state report message may include a message indicating that the requested function can be alternatively performed, as well as a message indicating that part of the requested function can be alternatively performed and a message indicating that the requested function cannot be alternatively performed.

In S904, the substitute search processing unit 616 refers to the information about the substitute states of the other devices which it has received from those devices and stored in the memory 223, and then determines an substitute device. For example, the substitute search processing unit 616 regards a device whose substitute state report message it has received first, as a substitute device.

In S905, the substitute search processing unit 616 determines whether it has determined a substitute device. If the alternate search processing unit 616 has determined a substitute device, it proceeds to S906; otherwise, it proceeds to S910.

In S906, the substitute search processing unit 616 transmits a substitute request message requesting substitute performance of the user-provided function to the determined substitute device and then waits for a performance result from the substitute device.

In S907, the substitute search processing unit 616 receives the result of substitute performance of the user-provided function from the substitute device and checks the result. If the substitute device has successfully alternatively performed the user-provided function, the substitute search processing unit 616 proceeds to S908; if the substitute device has unsuccessfully alternatively performed the function, it proceeds to S909.

In S908, the alternate search processing unit 616 sets the performance result to "alternatively performed" indicating that the user-provided function requested by the user has been successfully alternatively performed, ending the process.

In S909, the alternate search processing unit 616 sets the performance result to "alternatively unsuccessful" indicating that the user-provided function has been unsuccessfully alternatively performed, ending the process. If the performance result is "alternatively unsuccessful," the alternate search processing unit 616 incorporates, into the performance result, factor information where the factor of "alternatively unsuccessful" is represented by an error code or text.

In S910, the alternate search processing unit 616 sets the performance result to "unsuccessful search" indicating that it has been unable to find a substitute device for alternatively performing the user-provided function, ending the process. In the case of "unsuccessful search," as in "alternatively unsuccessful," the alternate search processing unit 616 incorporates, to the performance result, factor information where the factor of "unsuccessful search" is represented by an error code or text.

While the alternate search processing unit 616 waits for a message from the other devices for the predetermined time as shown in S903 of FIG. 9, it may omit S903 and select, as an substitute device, another device which has first transmitted an substitute state report message indicating that the device can alternatively perform the function.

Figure 10:
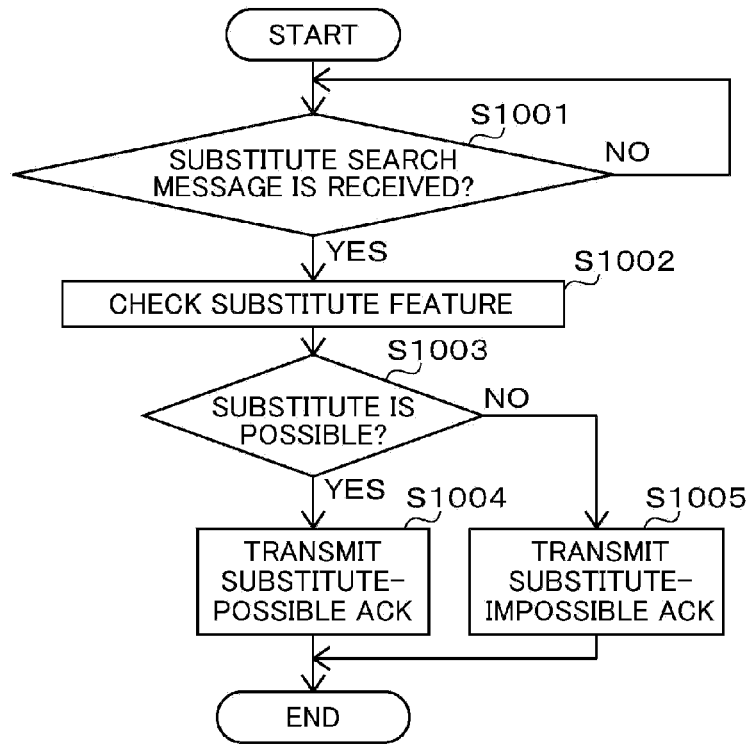
FIG. 10 is a diagram showing an example of the flow of a substitute search message reception process.

FIG. 10 is a diagram showing an example of the flow of the process performed by the substitute search processing unit 516 which has received a substitute search message. While the process performed by the substitute search processing unit 516 of the DTV 110 will be described hereafter, the substitute search processing unit 616 of the recorder 120 and the substitute search processing unit 716 of the STB 150 also perform basically the same process.

In S1001, the substitute search message broadcast in S901 of FIG. 9 is received by the first communication processing unit 510, analyzed by the first message analysis/generation unit 511, and then passed to the substitute search processing unit 516.

In S1002, the substitute search processing unit 516 checks whether there exits a substitute user function unit for alternatively performing the user-provided function designated by an argument [Target Feature] of the substitute search message.

In S1003, if there exits a substitute user function unit for alternatively performing the user-provided function designated by the argument, the substitute search processing unit 516 proceeds to S1004; otherwise, it proceeds to S1005.

In S1004, the substitute search processing unit 516 generates a substitute state report message indicating that substitute performance is possible, using the first message analysis/generation unit 511, and then transmits the message to the source of the substitute search message as a response.

In S1005, the substitute search processing unit 516 generates a substitute state report message indicating that substitute performance is impossible, using the first message analysis/generation unit 511, and then transmits the message to the source of the substitute search message as a response.

Figure 11:
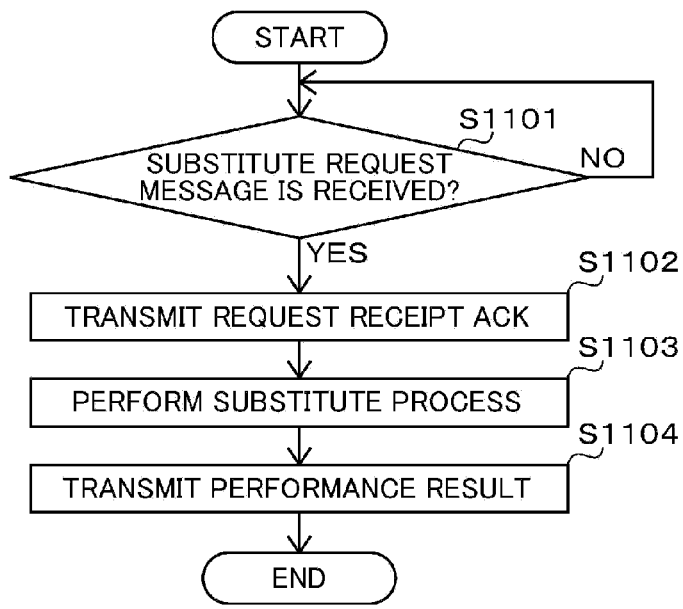
FIG. 11 is a diagram showing an example of the flow of a substitute request message reception process.

FIG. 11 is a diagram showing an example of the flow of the process performed by the substitute user function unit which has received the substitute request message. In this example, it is assumed that the DTV 110 is a substitute device.

In S1101, the substitute request message is received by the first communication processing unit 510, analyzed by the first message analysis/generation unit 511, and passed to the corresponding substitute user function unit. If an substitute request message requesting substitute performance of the "one-touch recording function" is received by the first communication processing unit 510, the substitute request message is passed to the one-touch recording substitute unit 517.

In S1102, the substitute user function unit (one-touch recording substitute unit 517) which has received the substitute request message transmits, to the source of the message, a request receipt ACK indicating that it has received the message, as a response. By transmitting the request receipt ACK as a response, the requesting side can confirm that the request has been accepted before the requested substitute performance of the function is complete.

In S1103, the substitute user function unit (one-touch recording substitute unit 517) alternatively performs the user-provided function requested by the substitute request message by using the network functions provided by the devices coupled to the second network.

In S1104, the substitute user function unit (one-touch recording substitute unit 517), which has alternatively performed the user-provided function, generates an substitute performance result notification message indicating the performance result, using the first message analysis/generation unit 511 and then transmits it to the source of the substitute request message.

Figures 14, 15, 16:
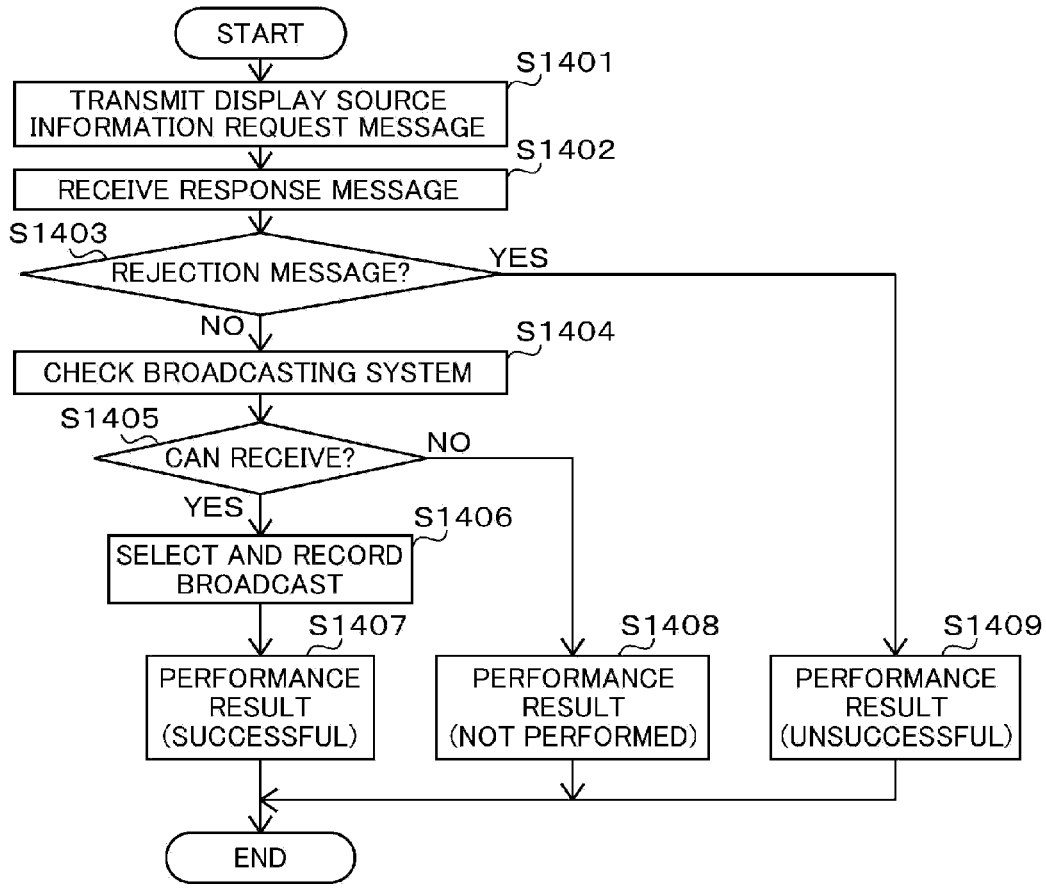
FIG. 14 is a diagram showing an example of the process flow of a "one-touch recording function."
FIG. 15 is a diagram showing an example configuration of a parameter [Recorde Source].
FIG. 16 is a diagram showing an example configuration of a parameter [Digital Service Identification].

Next, the "one-touch recording function" performed by the one-touch recording processing unit 621 will be described using FIG. 14. In the following description, a description in < > represents the command name (Opcode) of a CEC message; a description in [ ] represents the name of a parameter; and a value in " " represents the value of a parameter.

In S1401, the one-touch recording processing unit 621 transmits a display source information request message requesting information about the source being displayed, to the television coupled through the HDMI network, that is, the DTV 110, and then waits for a response message from the DTV 110. A one-touch recording request message is generated by the first message analysis/generation unit 511 in the form of a message used in the first network (HDMI network) and then transmitted through the first communication processing unit 510. For a CEC message, <Record TV Screen> is transmitted.

In S1402, the one-touch recording processing unit 621 checks a response message (a response to the display source information request message transmitted in S1401) from the DTV 110.

In S1403, the one-touch recording processing unit 621 receives a response message <Feature Abort>["<Record TV Screen>"]["Cannot provide source"] indicating rejection, it proceeds to S1409. If the one-touch recording processing unit 621 receives <Record On>[Record Source] indicating information about the source being displayed, it 621 proceeds to S1404.

In S1404, the one-touch recording processing unit 621 checks the parameter [Record Source] and determines whether the content is the content of a service receivable by the tuner 210 of the recorder 120. Details of the parameter [Record Source] and how to determine whether the content is the content of a receivable service will be described later.

In S1405, if the content is the content of a service receivable by the recorder 120, the one-touch recording processing unit 621 proceeds to S1406; otherwise, it proceeds to S1408.

In S1406, the one-touch recording processing unit 621 sets the tuner 210 so that the tuner 210 selects a program shown in the parameter [Record Source] and then requests the programming setting management unit 604 to record the program being received.

In S1407, the one-touch recording processing unit 621 sets the performance result of the one-touch recording process to "successful" indicating that the requested "one-touch recording function" has been successfully performed, ending the process.

If, in S1405, the content whose recording has been requested by the "one-touch recording function" is the content of a service which cannot be received by the recorder 120, the one-touch recording processing unit 621, in S1408, sets the performance result to "not performed" indicating that the "one-touch recording function" cannot be performed, ending the process.

If the one-touch recording processing unit 621 receives the response message indicating rejection, it sets the performance result to "unsuccessful" in S1409. The one-touch recording processing unit 621 adds, to the performance result, factor information where the factor of "unsuccessful" is represented by an error code or text. The one-touch recording processing unit 621 sets, in the factor information, the value of the second argument [Abort Reason] of the received message <Feature Abort>. The message <Feature Abort> described in S1403 is an example where the value of [Abort Reason] is set to "Cannot provide source."

Hereafter, there will be described the method by which the one-touch recording processing unit 621, in S1404 of FIG. 14, checks the parameter [Record Source] and determines whether the content is the content of a receivable service. FIG. 15 is a diagram showing an example configuration of the parameter [Record Source] of <Record On>[Record Source] indicating information about the source being displayed which is transmitted by the DTV 110.

If the DTV 110 is displaying a broadcast received by the tuner 210 thereof, it transmits a CEC message <Record On>["Digital Service"][Digital Service Identification] where the parameter [Record Source] is pattern 1.

If the DTV 110 is displaying a source outputted by the recorder 120, it transmits pattern 2.

If the parameter [Record Source] is pattern 2, the one-touch recording processing unit 621 determines that the content is the content of a receivable service since the source is a source outputted to the DTV 110 by the recorder 120 itself.

If the parameter is pattern 1, the one-touch recording processing unit 621 makes a determination on the basis of details of the parameter [Digital Service Identification]. FIG. 16 is a diagram showing the configuration of the parameter [Digital Service Identification]. As shown in FIG. 16, the parameter [Digital Service Identification] includes a parameter [Service Identification Method], a parameter [Digital Broadcast System], and a parameter [Service Identification]. Of these, the parameter [Digital Broadcast System] represents the type of the broadcasting system, such as terrestrial digital broadcasting, digital cable television (CATV) broadcasting, or BS broadcasting.

The one-touch recording processing unit 621 determines whether the recorder 120 can receive the broadcasting system of the source, on the basis of the value of the parameter [Digital Broadcast System]. The recorder 120 in the present embodiment determines that it can receive only sources whose broadcasting system is terrestrial digital broadcasting.

Next, there will be described messages transmitted or received in the process flows described using FIGS. 9, 10, 11, and 14.

Figure 12:
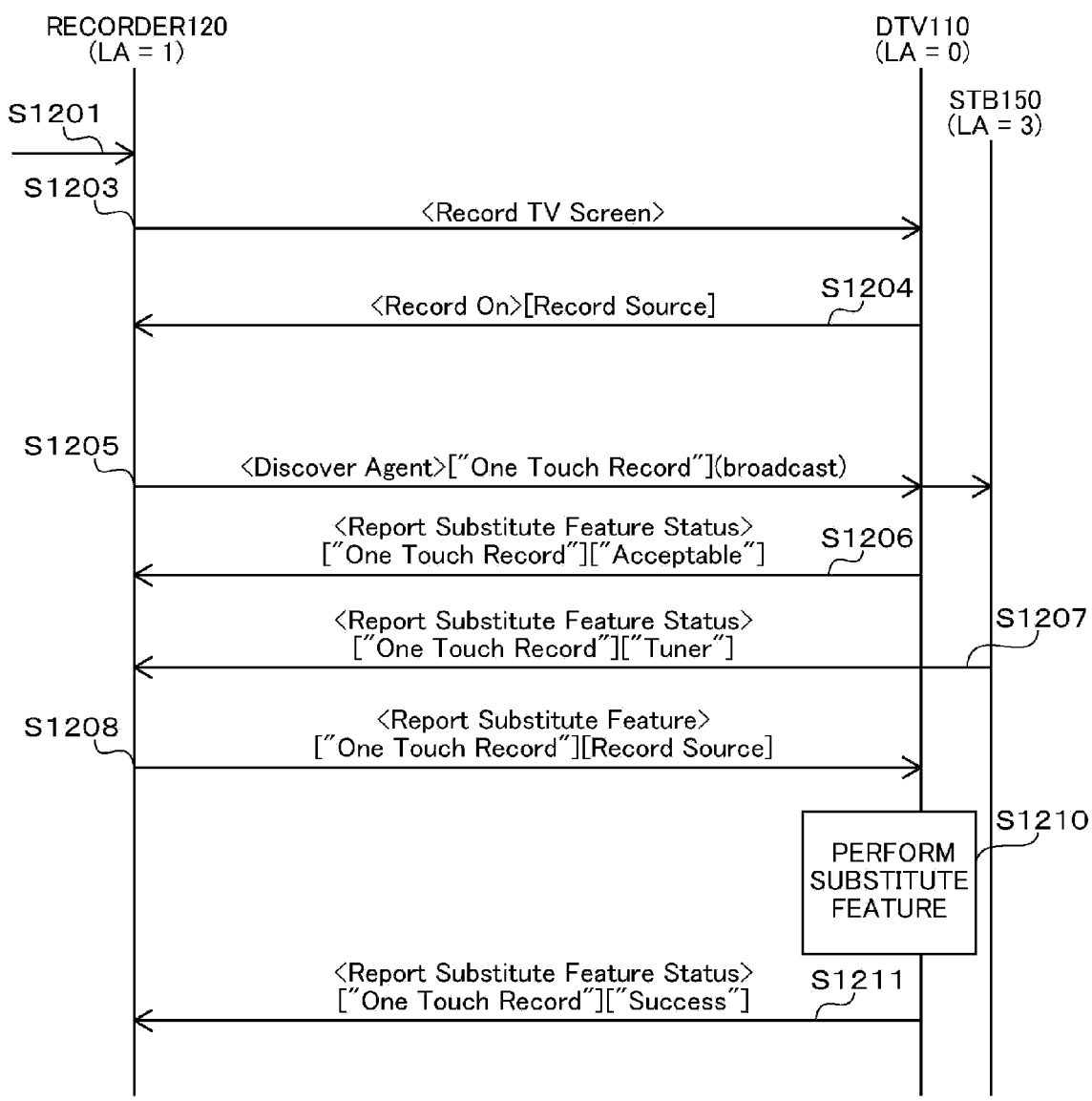
FIG. 12 is a diagram showing an example of a "one-touch recording function" substitute performance sequence.

FIG. 12 is a diagram showing transmission or reception of messages when the "one-touch recording function" is alternatively performed. The recorder 120 receives a request to perform the "one-touch recording function" from the user, requests to alternatively perform the function, and receives a performance result. The sequence in FIG. 12 will be described on the assumption that the user requests the recorder 120 to perform the "one-touch recording function," which is a user-provided function of the HDMI network. Further, in the present embodiment, it is assumed that CEC messages are used as messages transmitted or received in the HDMI network.

"LA" in FIG. 12 is a logical address assigned to each device in the HDMI network. Such logical addresses are described in the header of a CEC message as addresses representing the source and destination of the message. FIG. 12 shows that a logical address "1" indicating "Recording Device1" is assigned to the recorder 120; a logical address "0" indicating "TV" to the DTV 110; and "3" indicating "Tuner1" to the STV 150.

A logical address is an identifier uniquely identifying the device in the HDMI network, as well as defines the type of the device. For example, a logical address "0" is assigned to a device whose device type is TV; logical addresses "1," "2," and "9" are assigned to devices whose device type is recording device in ascending order; and logical addresses "3," "6," "7," and "10" are assigned to devices whose device type is tuner in ascending order.

The devices coupled to the HDMI network can grasp the correspondence between the physical addresses and logical addresses of the coupled devices and the types of the devices on the basis of a CEC message <Report Physical Address> having the physical addresses and device types as parameters which is broadcast by a device which has been coupled to the HDMI network and acquired a logical address. In FIG. 12, a description in < > represents the command name (Opcode) of a CEC message; and a description in [ ] represents the name of a parameter; and a value in " " represents the value of a parameter.

In S1201, the recorder 120 receives a user operation requesting performance of the "one-touch recording function." The user-provided function management unit 512 of the recorder 120 detects the user operation made using the remote controller or the like. If the user-provided function management unit 512 determines that the user operation indicates a request to perform the "one-touch recording function," it requests the one-touch recording processing unit 621 to start performing the function.

In S1203, the one-touch recording processing unit 621 starts performing the "one-touch recording function." First, the one-touch recording processing unit 621 transmits, to the TV coupled through the HDMI network, in the case of the system of FIG. 1, to the DTV 130, a message <Record TV Screen> requesting information about the source being displayed.

In S1204, the first message analysis/generation unit 511 analyzes the message <Record TV Screen> and then passes it to the one-touch recording responding unit 517. The one-touch recording responding unit 517 transmits a response message to the message received in S1203. At this time, the one-touch recording responding unit 517 refers to the display information acquisition unit 503. If it can acquire information about the source being displayed, the one-touch recording responding unit 517 transmits a message <Record On>[Record Source] indicating the source information, as a response message. If it cannot acquire the source information, the one-touch recording responding unit 517 transmits a message <Feature Abort>["<Record TV Screen>"]["Cannot provide source"]. FIG. 12 shows a case where the one-touch recording responding unit 517 can acquire the source information.

In S1205, the one-touch recording processing unit 621, which has received the response message from the DTV 110, performs processing. This process is as described using FIG. 14. Based on the performance result of FIG. 14, the user-provided function management unit 612 determines whether it is subject to substitute performance of this function (FIG. 8, S804). If it determines that it should, the user-provided function management unit 612 requests the substitute search processing unit 616 to alternatively perform the function. The substitute search processing unit 616 broadcasts a substitute search message shown in S1205 (FIG. 9, S901). The substitute search message is defined as a new instruction of the CEC message or as a vendor-specific message <Vendor Command with ID> approved by the CEC. In S1205, a message using a newly defined instruction is used. Hereafter, a newly defined message will be described using FIG. 17.

FIG. 17(a) is an example where a substitute search message is newly defined. <Discover Agent> is the command name of an instruction to search for a device which provides a substitute feature, and the substitute feature to be searched for is specified by a parameter [search function]. FIG. 17(d) shows the definition of the parameter [search function]. "One Touch Record" indicates that the message is searching for a device which alternatively performs the one-touch recording function"; "Timer Programming" indicates that the message is searching for a device which alternatively performs the "programmed recording function." [Record Source] received from the DTV 110 may be added as a parameter of this message. By adding a parameter, the function that a substitute device has to have can be specified. This is advantageous in that unnecessary responses can be omitted.

FIG. 17(b) is an example where the substitute search message is defined as a vendor-specific message <Vendor Command with ID>. A vendor-specific message can be defined as <Vendor Command with ID>, where [Vendor ID] is added as a parameter, or <Vendor Command>, where [Vendor ID] is not added as a parameter. If the substitute search message is defined as a vendor-specific message, <Vendor Command with ID> is used since <Vendor Command with ID> can be broadcast.

A parameter [Vendor Opcode] is the command name of a vendor definition instruction. FIG. 17(c) shows the definitions of the parameter [Vendor Opcode]. "Discover Agent" indicates that the message is a substitute search message to search for a substitute feature; "Request Substitute Feature" indicates that the message is a substitute search message to request substitute performance of the function. "Report Substitute Feature Status" indicates that the message is a substitute result report message to report the result of substitute performance of the function.

A parameter [Vendor Parameter] is a parameter requested of [Vendor Opcode]. The form of the parameter [Vendor Parameter] varies depending on details of [Vendor Opcode]. If the value of [Vendor Opcode] is "Discover Agent," the parameter [search function] is added. If the value of [Vendor Opcode] is "Request Substitute Feature," a parameter [recording source information] is added. FIG. 17(f) is a definition example of the vendor-specific message <Vendor Command>. This message has the same configuration as <Vendor Command with ID> except that it does not have the parameter [Vendor ID].

In S1206 and S1207, devices which have received the broadcast substitute search message, when they have the corresponding substitute feature, each transmit a newly defined substitute state report CEC message <Report Substitute Feature Status> indicating the state of the substitute feature specified by the parameter [search function], as a response. If the DTV 110 has the function of alternatively performing the "one-touch recording function," it transmits a CEC message indicating that substitute is possible, as a response. If the DTV 110 does not have such a substitute feature, it does not make a response.

In the present embodiment, the STB 150 does not have the function of alternatively performing the "one-touch recording function" but has a tuner receiving function and thus can transfer received content over the DLNA, and in such a case, in S1207, STB 150 transmits a message to that effect including a parameter ["Tuner"], as a response. As described above, the substitute state report message may be defined as a vendor-specific message.

In S1208, the substitute search processing unit 616, which has received response messages, determines a substitute device that it will request to alternatively perform the function. The alternate search processing unit 616 then transmits a substitute request message to the determined device, in the present embodiment, to the DTV 110 (a step corresponding to S906 of FIG. 9). The substitute request message is defined as a new instruction of the CEC message. It may be defined as a vendor-specific message approved by the CEC. Hereafter, a newly defined message will be described using FIG. 18.

FIG. 18(a) is an example of a newly defined substitute request message. <Request Substitute Feature> is the command name of an instruction to request the performance of a substitute feature specified by a parameter [substitute feature]. Note that the definition of the parameter [search function] shown in FIG. 17(d) is used as the definition of the parameter [substitute feature]. A parameter [recording source information] is information about the source to be recorded using the "one-touch recording function." The parameter [Record Source] of the message <Record On> [Record Source] transmitted from the DTV 110 in S1204 is inserted into the parameter [recording source information].

In S1210, the device which has received the substitute request message performs the function alternatively. The process of alternatively performing the function will be described later.

In S1211, the DTV 110, which has alternatively performed the function, transmits a substitute state report message indicating the result of the performance to the recorder 120. It is notified that the message has been received, using a parameter ["Success"].

FIG. 18(b) is an example of a newly defined substitute result report message. <Report Substitute Feature Status> is the command name of an instruction reporting the result of performance of a substitute function whose performance has been requested. A parameter [substitute feature] represents the substitute function of reporting the result of performance.

The definition of the parameter [search function] shown in FIG. 17(d) is used as the definition of the parameter [substitute feature]. A parameter [Result] is a parameter indicating the result. FIG. 18(c) shows the definitions of the parameter [Result]. "Success" shows that the function has been successfully alternatively performed; "Failure" shows that the device has the function but has unsuccessfully performed it. "Acceptable" shows that the device has the function as shown in S1206; "Tuner" shows that the device has the tuner reception function as shown in S1207. "No Feature" shows that the device has no substitute feature.

Figure 13:
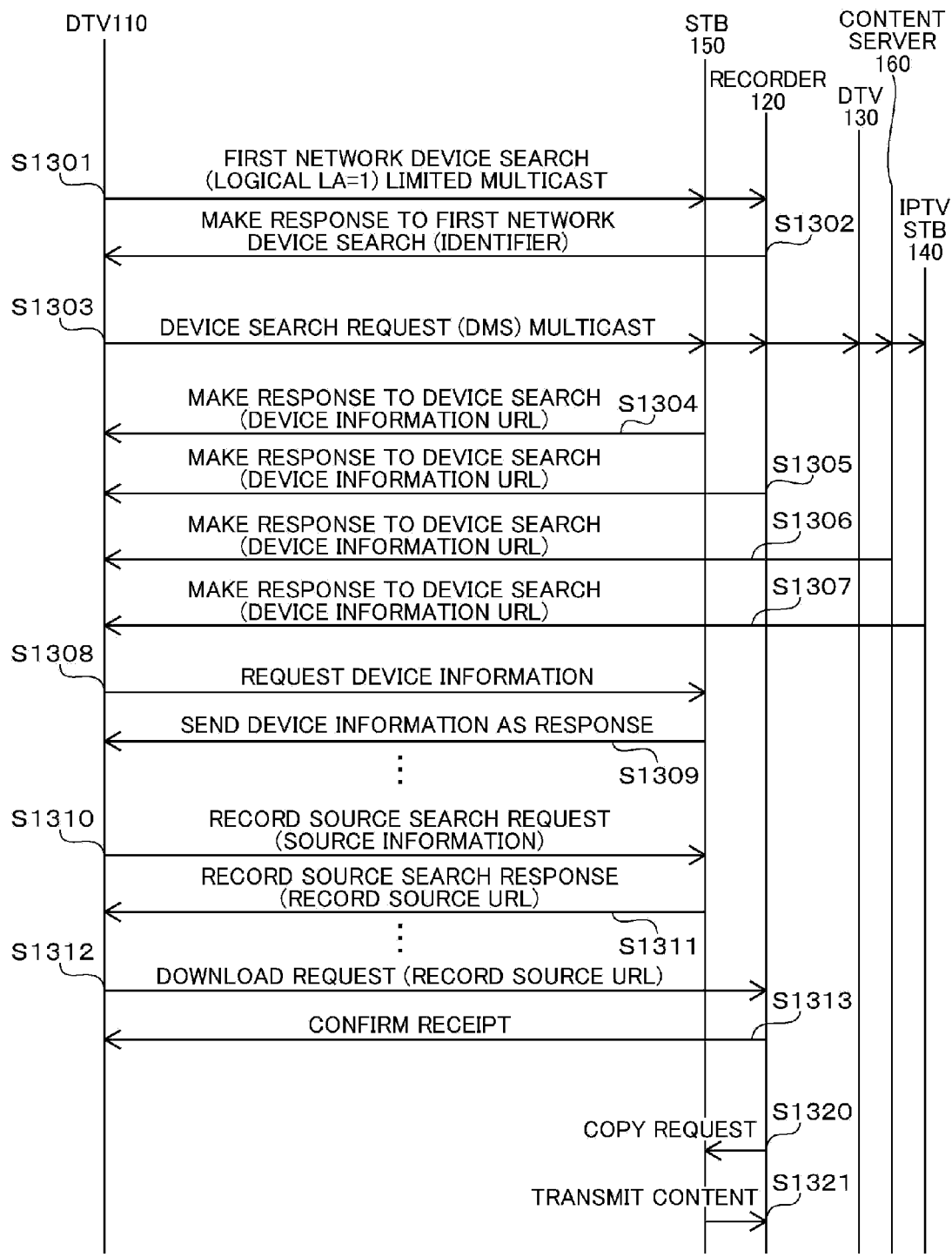
FIG. 13 is a diagram showing an example of the process sequence of one-touch recording based on a substitute process.

Next, referring to FIG. 13, transmission or reception of messages when the function is alternatively performed in S1210 will be described using, as an example, the process of alternatively performing the "one-touch recording function." FIG. 13 is a diagram showing an example of transmission or reception of messages when one-touch recording is alternatively performed.

In S1301, first, the one-touch recording substitute unit 521 of the DTV 110, which has started performing the function alternatively, transmits a network device search message to the second network in the form of a limited multicast and then acquires an identifier in the second network assigned to the device (recorder 120) which performs "one-touch recording" in the first network. This is intended to instruct, through the second network, the recorder 120 to record the programming target source which has been found in the second network.

As used herein, a "limited multicast" refers to a message received only by the devices having the HEC function provided by the first network (HDMI network). For example, the limited multicast message transmitted by the DTV 110 is received only by the recorder 120 and the STB 150 and is not transferred to the hub 15. Accordingly, the network device search message is not transmitted to an HDMI network formed by the DTV 130 and the IPTV STB 140 (hereafter referred to as "HDMI network 2), which is independent of the HDMI network formed by the DTV 110, the recorder 120, and the STB 150.

Where multiple HDMI networks exist, the HDMI network and the HDMI network 2 include devices having the same logical address since addresses are assigned in the respective HDMI networks. However, by using a limited multicast message, the destinations of the network device search message are limited. Thus, the DTV 110 can receive a response only from the desired device, the recorder 120.

FIG. 19(a) shows an example configuration of the network device search message. "M-SEARCH*HTTP/1.1" represents a HyperText Transfer Protocol (HTTP) request message and indicates that this request is a search message.

A field "HOST" is a field where the destination of the message is described, and includes a field "hostname," where the IP address of the destination is described, and a field "portNumber," where the port number is described. Only "hostname" and "portNumber" are defined in a multicast. In the present embodiment, for IPv4, "hostname" is defined as "239.255.255.251," and "portNumber" is defined as "50000."

A field "MAN" represents an extension of HTTP. "ssdp: discover" of FIG. 19(a) shows that search (discover) of the Simple Servece Discovery Protocol (SSDP) is used as the search protocol for searching for a first-network device.

A field "MX" specifies the maximum waiting time (second) of a response. If a response is waited for three seconds, 3 is described. A field "ST" is a field "target to be searched for" specifying the target to be searched for. The logical address of the device to be searched for is described in the network device search message. Assuming that the recorder 120 is searched for, "hdmi:logicalAddress:1" indicating that the message is searching for a device to which the HDMI logical address, 1, is assigned is described.

If a message having hostname and portNumber representing the limited multicast comes from a channel other than the HEC, a layer 2 switch included in a HEC device does not send the message to the HEC. The reason is that an HEC device which does not support the limited multicast message may output the limited multicast message coming from another HEC device to devices other than the devices in the HDMI network including the HEC device through a LAN terminal other than an HDMI terminal. This is one of measures for preventing the devices in the HDMI network from capturing this erroneous message. Further, if a certain device is detected to be a device not supporting the limited multicast, by acquiring capacity information of this device such as the version number of the device, the limited multicast message may be prevented from being transmitted to the device in order to avoid a malfunction related to the limited multicast.

In the HDMI network, it is assumed that each HDMI device has one output terminal. Accordingly, if there exist HEC devices having two or more HDMI output terminals each having the HEC function in the HDMI network, the limited multicast is preferably prevented from being transferred between these HEC devices in order to prevent a malfunction. The limited multicast may also be transmitted or received only between devices which can be subjected to CEC cooperation control.

In S1302, the devices which have received the network device search message (recorder 120 and STB 150) analyze and process the message using the device information providing service units 635 and 735, respectively. The device information providing service units 635 and 735 refer to the HDMI device information held by the first message analysis/generation units 611 and 711. If the HDMI device information matches the condition in the field "target to be searched for," these device information providing service units transmit a network device search response message to the DTV 110 as a response to the network device search message. The HDMI device information includes logical addresses, physical addresses, and the like.

In the present embodiment, the HDMI logical address of the recorder 120 is 1 and therefore matches the condition in the field "target to be searched for." The network device search response message has a field "NW-ID," in which an identifier uniquely identifying the device in the second network is described. For example, an IP address is described in the field "NW-ID." With this information, the DTV 110 can know the identifier (IP address) identifying, in the second network, the recorder 120 having the HDMI logical address "1" in the first network.

FIG. 19(b) shows an example of the network device search response message. "HTTP/1.1 200 OK" indicates that this message is an HTTP response message. "CACHE-CONTROL" is a header indicating the validity period of the HTTP response, and the value set in a field "max-age" sets the maximum period (second) in which this message is regarded as being latest. If the maximum period is three minutes, 180 is described. "DATE" is a field in which the date and time when this response message has been created are described. A field "NW-ID" is a field in which an identifier uniquely identifying the device in the second network is described. A field "ST" is a field in which "target to be searched for" is described.

In S1303, the DTV 110 associates the identifier (HDMI logical address) in the first network and the identifier (IP address) in the second network of the recorder 120 with each other and then searches for a device which can provide a source "Record Source" whose recording has been requested by the "one-touch recording function." Accordingly, the one-touch recording substitute unit 521 requests the device information acquisition unit 535 to search for a device having the DMS function. The device information acquisition unit 535 multicasts a device search message searching for the DMS to the second network. This message is transferred to all devices forming the second network.

In S1304, S1305, S1306, and S1307, the devices having the DMS function (in the system of FIG. 1, the recorder 120, the STB 150, the IPTV STB 140, and the content server 160 have the DMS function) each transmit a device search response message to the DTV 110. The device search messages for searching for the DMS transmitted to the DTV 110 are processed by the device information providing service.

In S1308 and S1309, the DTV 110 transmits a message requesting device information to the devices having the DMS function and then acquires device information from the devices. The device search response messages received in S1304 to S1307 each include a device information URL to be accessed to acquire function information which provides a list of functions provided to the network by the device or control information (operation action name, argument, or the like) for using the function. Accordingly, the device information acquisition unit 535 accesses the device information URLs of the devices from which it has received the device search response messages, and then acquires function information and control information.

While transmission or reception of messages between the DTV 110 and the STB 150 are shown in FIG. 13, the DTV 110 also accesses the device information URLs of the STB 150, the IPTV STB 140, and the content server 160 to acquire function information and control information. At this time, the DTV 110 does not need to acquire function information or control information of the device which performs "one-touch recording" in accordance with the instruction of the one-touch recording substitute unit 521. This is because the device which performs "one-touch recording" cannot provide the source "Record Source" whose recording has been requested by the "one-touch recording function." In the present embodiment, the recorder 120 is the device which performs "one-touch recording." The association between the identifier (HDMI logical address) in the first network and the identifier (IP address) in the second network of the recorder 120 is as described in S1301 and S1302.

If any device search response message to the device search message in S1303 has not been transmitted, the process ends since "one-touch recording" cannot be performed alternatively. The DTV 110, in S1211 of FIG. 12, transmits a substitute result report message indicating that the function has been unsuccessfully alternatively performed.

In S1310, the one-touch recording substitute unit 521 refers to the function information and the control information acquired in S1309 and transmits, to a device having the content information service function of providing content list information, a record source search request message in which "Record Source" is specified as a source information parameter so as to check whether the device can provide "Record Source." In FIG. 13, the one-touch recording alternate unit 521 transmits the record source search request message only to the STB 150. However, if there exist other devices having the content information service function of providing content list information, the one-touch recording alternate unit 521 may transmit the record source search request message to the multiple devices.

In S1311, the content information service (in the case of the STB 150, 734) which has received the record source search request message refers to the program information generation unit 702 and checks whether there is content information corresponding to the content specified by the source information parameter. If the corresponding content exists, the content information service transmits, to the DTV 110, a record source search response message in which a URL to be accessed to acquire the content is described in a record source URL parameter. If any content information corresponding to the specified content does not exist, the content information service transmits, to the DTV 110, a record source search response message including no record source URL parameter. Note that FIG. 13 shows a process when the STB 150 includes the corresponding content information.

If any record source search response message including a record source URL to the record search request message in S1310 has not been transmitted, the process ends since "one-touch recording" cannot be performed alternatively. The DTV 110, in S1211 of FIG. 12, transmits a substitute result report message indicating that the function has been unsuccessfully alternatively performed.

In S1312, the DTV 110, which has acquired the URL to acquire the record source in the record source search response message in S1311, transmits, to the recorder 120, a download request message in which the URL to be accessed of the record source is described in a record source URL parameter.

In S1313, the recorder 120, which has received the download request message, transmits a receipt confirmation message indicating that it has received the request message, to the DTV 110 as a response. The DTV 110, which has received the receipt confirmation message, determines that the "one-touch recording" has been successfully alternatively performed and then transmits, in S1211 of FIG. 12, an substitute result report message indicating that the function has been successfully alternatively performed.

In S1320, the recorder 120, which has received the download request message, transmits a content copy request to the record source URL using an HTTP GET request or the like. The STB, which is accessed from the record source URL, transmits the content through the second network (S1321). Note that in the request of the content copy and the transmission of the content, if the content is content whose copyright should be protected, device authentication or the like is performed, and the content is properly encrypted and then transmitted.

As described above, according to the present invention, it is possible to provide an video device and control method which if an operation requested in the first network (HEMI network) cannot be performed, perform the requested operation by using the function of a device coupled to the second network (DLNA network).

If the recorder 120 itself has the substitute feature shown in FIG. 13, the recorder may perform the process of FIG. 13 in place of the DTV without searching for a substitute feature in the HDMI network. If the DTV 110 can provide, to the recorder 120, the content whose recording has been requested, it may transmit the content to the recorder 120 through the second network without performing the process of FIG. 13.

[Second Embodiment]

In the present embodiment, there will be described an video device and control method which when an operation requested in the second network (DLNA network) cannot be performed, perform the requested function by using also the function of a device coupled to the first network (HDMI network).

Figure 20:
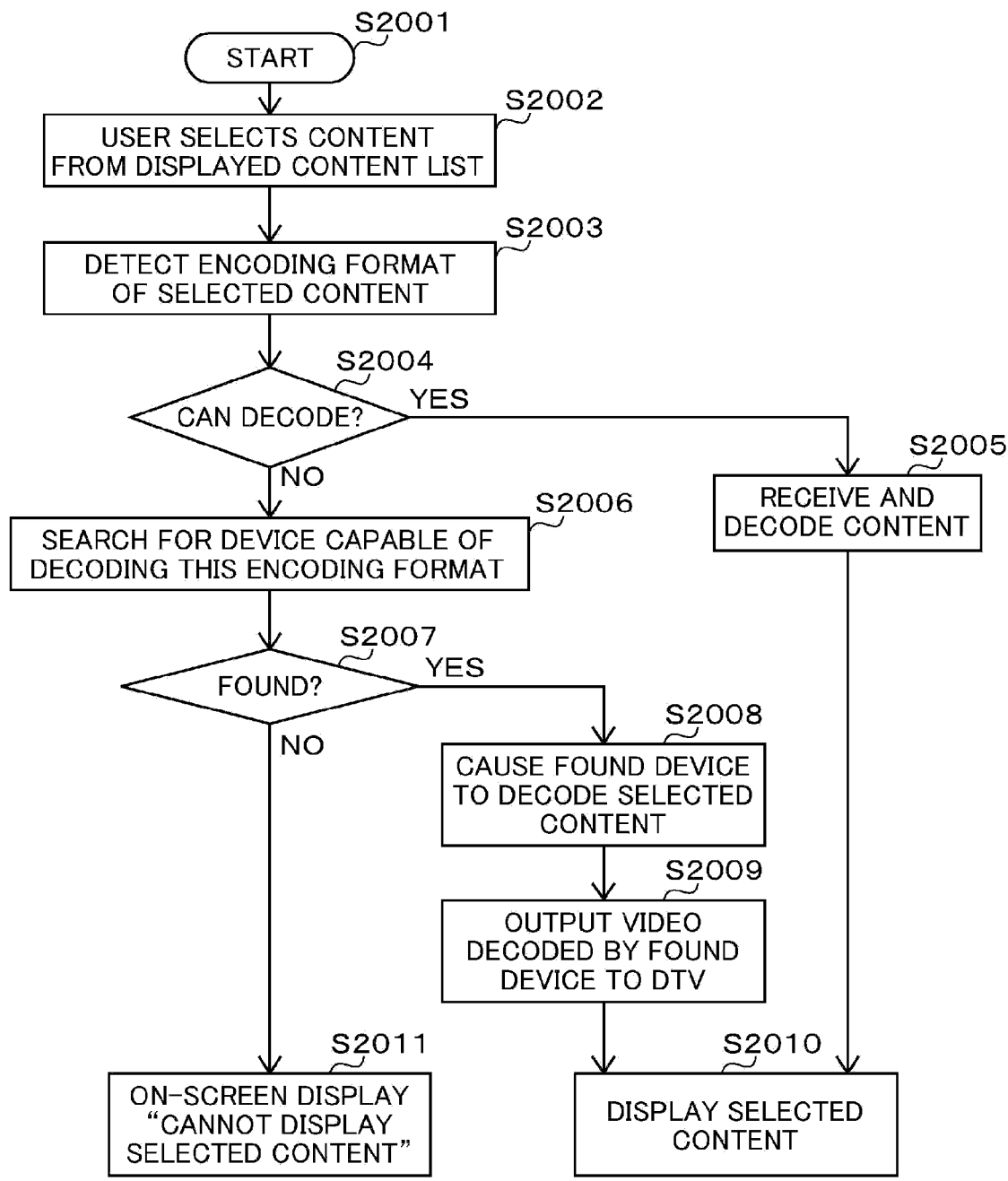
FIG. 20 is a diagram showing an example of the flow of the process of causing another device to alternatively play back content.

In a DNNA server/client system where content recorded in the content server 160 of FIG. 1 is viewed on the DTV 110, when the user selects content which is encoded in a format which the DTV 110 does not support, the DTV 110 cannot decode or display the content. For this reason, the DTV 110 searches the HDMI network for an substitute device (e.g., recorder 120) including a decoder which supports the encoding system, and the substitute device outputs the decoded/played-back content to the DTV 110 through the HDMI. Thus, the DTV 110 can display the content. There will be described an example where the decoder of the recorder 120 is substituted for the decoder of the DTV 110, as described above. FIG. 20 is a diagram showing an example of the flow of the process of causing another device to alternatively play back content.

In S2001, the DTV 110, which has acquired content information from the content server 160, is displaying a content list in a menu form.

In S2002, the user selects the desired content from the displayed content list by pointing to the content using the remote controller 250 or the like.

In S2003, the DTV 110 detects the encoding format of the selected content by inquiring the encoding format of the content server 160 or extracting it from pieces of information previously acquired as content information.

In S2004, the DTV 110 determines whether the encoding format of the selected content is decodable by the decoder 213 thereof. If the encoding format is decodable, the DTV 110 proceeds to S2005; otherwise, it proceeds to S2006.

In S2005, the DTV 110 downloads the content from the content server 160, decodes it using the decoder 213, and then proceeds to S2010.

In S2006, the DTV 110 searches the HDMI network for a video device which can decode the encoding format of the selected content. Alternatively, the DTV 110 may previously investigate encoding formats supported by the devices in the HDMI network and store pieces of information about the encoding formats and then search the stored pieces of information. This is advantageous in that the search time can be reduced compared to when the DTV 110 newly searches the HDMI network.

Further, by previously investigating encoding formats supported by the devices in the HDMI network and storing pieces of information about the encoding formats, it is possible to avoid content in an encoding format which cannot be encoded by the devices in the HDMI network from being displayed as selectable content or to add, to the content list, information indicating that there is no decoder supporting the content. As seen above, by previously searching for necessary information and storing it, it is possible to reduce the processing time, allowing the user to operate the device comfortably.

In S2007, if the DTV 110 finds a decodable device, it proceeds to S2008; otherwise it proceeds to S2011.

In S2008, the DTV 110 notifies the found device (e.g., recorder 120) of information about the selected content, such as information about a content server which can provide the selected content. The found device downloads or streams the content from the content server and then decodes it.

In S2009, the found device (e.g., recorder 120) ensures an HDMI video signal transmission route from the found device to the DTV 110 so that the decoded video can be transmitted to the DTV 110.

In S2010, the DTV 110 displays, on the video display unit 220, the video signal obtained by decoding the selected content using the decoder of the DTV 110 itself or the decoder of the found device.

In S2011, since there is no means capable of decoding the selected content in the HDMI network, the DTV 110 shows the user an OSD or the like indicating that "the selected content cannot be displayed" and recommends that the user select other content.

Figure 21:
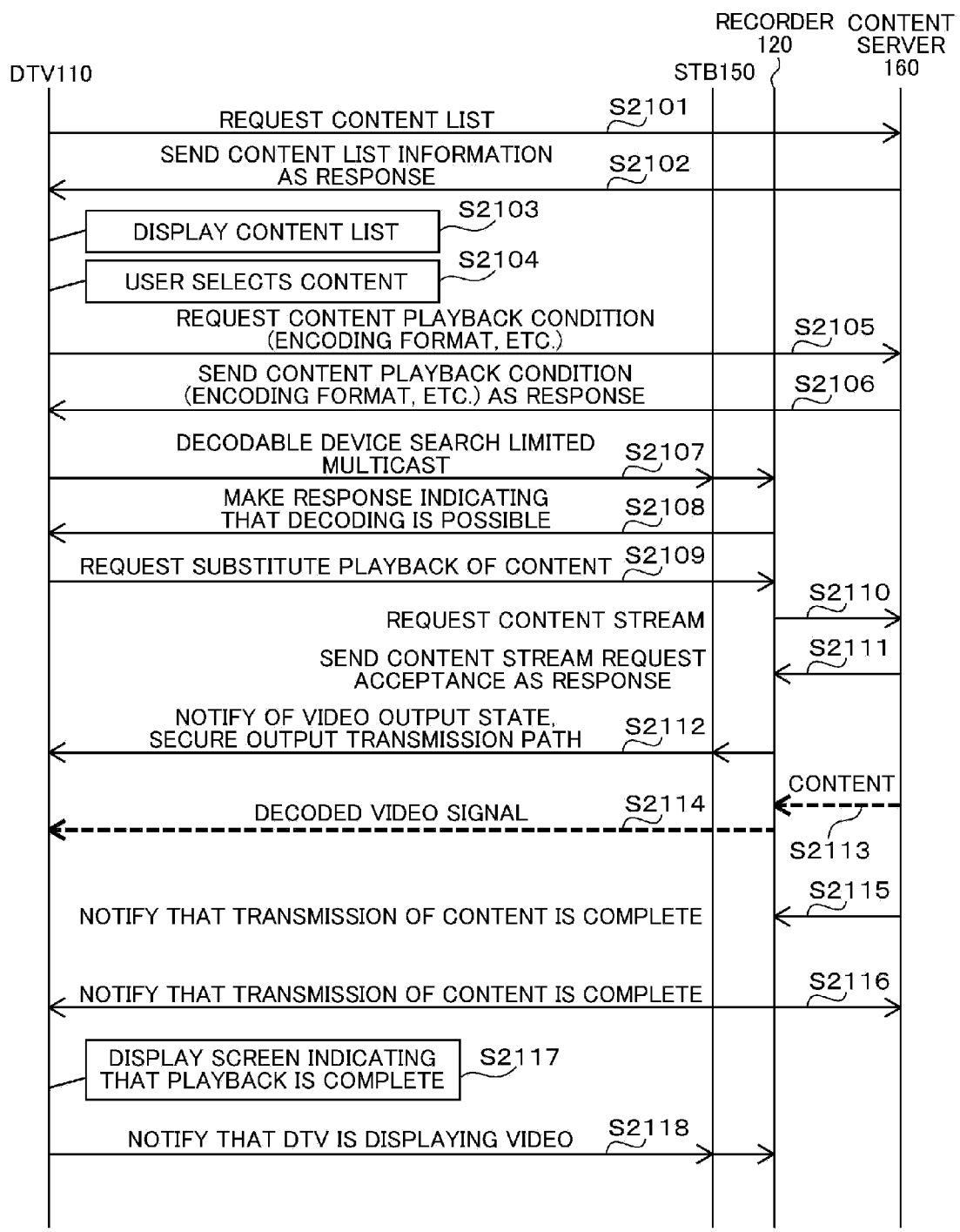
FIG. 21 is a diagram showing an example of a sequence for allowing to alternatively play back content.

Next, the messages transmitted or received in the process flow described using FIG. 20 will be described using the process sequence diagram of FIG. 21. FIG. 21 is a diagram showing an example of a sequence for causing another device to alternatively play back content.

In S2101, the DTV 110 transmits a DLNA message requesting a content list to the content server 160.

In S2102, the content server 160 transmits a DLNA message including content list information to the DTV 110 as a response to the message of S2101.

In S2103, the OSD unit 215 of the DTV 110 generates content list display video for video selection and displays it on the video display unit 220. S2103 corresponds to S2001 of FIG. 20.

In S2104, the user selects the desired content using the operation device 250 or the like. S2104 corresponds to S2002 of FIG. 20.

In S2105, the DTV 110 inquires the content playback conditions related to the selected content, including the encoding format, of the content server 160 using a DLNA message.

In S2106, the content server 160 transmits a DLNA message including the content play back conditions, including the encoding format, to the DTV 110 as a response to the message of S2105. The exchange of the DLNA messages in S2105 and S2106 corresponds to S2003 of FIG. 20.

In S2107, if the DTV 110 does not support the encoding format obtained in S2106, it transmits a limited DLNA multicast message to search for a decodable device to all the devices (STB 150 and recorder 120) in the HDMI network including the DTV 110. S2107 corresponds to S2006 of FIG. 20.

FIG. 19(c) shows the configuration of this limited multicast message. While this message has a similar format to that of FIG. 19(a) described in the first embodiment, it differs from the latter in the target to be searched for described in the field ST. In the example of FIG. 19(c), H264 is described as the encoding format which needs to be decoded. "Hi422P" following "H264" represents the function of "High 4:2:2 Profile." The subsequent "Level 4" represents processing load or memory usage.

While the example where a decodable device is searched for using a limited DLNA multicast message has been described in the present embodiment, a decodable device may be searched for using other methods. For example, a decodable device may be searched for using the function of the HDMI network (e.g., using a CEC message).

In S2108, if the decoder 213 of the recorder 120 in the HDMI network supports the encoding format, the recorder 120 transmits a DLNA response message indicating that the recorder 120 is decodable to the DTV 110. By receiving this message, the DTV 110 finds that the recorder 120 is decodable. S2108 corresponds to S2007 of FIG. 20.

For the message indicating that the recorder 120 is decodable, a decodable device may be searched for, for example, using the function of the HDMI network (e.g., using a CEC message).

If the recorder 120 is using the decoder thereof for another purpose or if it is distributing, or receiving and recording other content to or from another device over the DLNA, the recorder 120 may not be able to alternatively decode the content. If the recorder 120 cannot alternatively decode the content as described above, it does not transmit a message that it can decode the content, or may transmit a state notification indicating that it can decode the content but is currently unavailable. When the DTV 110 receives the state notification indicating that the recorder 120 is currently unavailable, it may provide the user with information indicating that the recorder 120 can decode the content if the time is shifted, using an OSD. If the message indicating that the recorder 120 can decode the content includes specific information such as a programmed time, the DTV 110 can also provide the user with waiting time information. Thus, usability is increased.

While the recorder 120 may cause other devices to use the decoder thereof on a first-come first-served basis, it may also previously determine the order in which services use the decoder. The recorder 120 may also notify, through the DTV, the user that the decoder is in use so that the user can determine to which of the service which is using the decoder and the requested substitute decoding of the video the user should give higher priority. In this case, the DTV 110 may add information indicating the order in which the decoder is used to a message requesting substitute playback described in subsequent S2109, or newly define and use a DLNA message or CEC message to stop the service which is using the decoder. By using these methods, the user himself or herself can select a service which the user wants to give higher priority. Thus, a system having high user satisfaction can be provided.

In S2109, the DTV 110 transmits a DLNA message (or a message (CEC message) using the HDMI network) requesting substitute playback of the content to the recorder 120. At this time, the DTV 110 adds the URL of the content and destination information of the decoded video to this request message.

For example, the DTV 110 may transmit a message "AVT:SetAVTransportURI" (the URI of the content, metadata of the content), which specifies the location of the content, and a message "AVT:Play" (playback speed), which requests playback of the content. The metadata of the content, which is auxiliary information, includes the title, size, copyright information, and the like of the content. If the playback speed parameter is set to "1," the normal playback is instructed. If the two messages do not include any destination information, which is auxiliary information, the recorder 120 may output the decoded video signal in a predetermined manner, for example, by outputting the video signal from the HDMI terminal, which the recorder 120 uses as a normal output terminal.

There are multiple conceivable methods by which when the DTV 110 receives, from multiple devices, a message indicating that the device can decode the content, it selects a device which it should request to alternatively play back the content. For example, by requesting a device which has first transmitted a message to alternatively play back the content, the selection process is facilitated. Alternatively, the DTV 110 may cause the devices to add information about the image quality of the decoder, such as the resolution or gray-level number of the video output, to the response messages indicating that the device can decode the content so that the DTV 110 can select a device including a decoder which can be expected to generate higher-quality image. Thus, a higher-quality image can be displayed. If an HDMI relay is disposed between each decodable device and the DTV 110, the DTV 110 may select a device on the basis of the performance of the relays, for example, by selecting a device through a relay whose relaying degrades image quality such as resolution or gray scale to a lesser extent or selecting a device through a relay which can handle high-image-quality signals. Thus, the user can view the content with higher image quality. Alternatively, the DTV 110 may select a decodable devise such that the number of HDMI relays between the decodable device and the DTV is minimized or a decodable device such that the sum of power consumed by relays is minimized. Thus, it is possible to reduce power consumption when the content is alternatively played back.

The content server transmits video content to the decodable device through the DLNA network. However, depending on the state of the LAN between the content server and the decodable device, a sufficient transmission band may not be secured. Thus, a reduction in the image quality of the decoded video, such as drop-frame of a moving image, may occur. For this reason, preferably, the DTV 110 causes the decodable devices to add information about a transmission band which can be secured or is expected to be secured between the content server and the decodable device to the response messages indicating that the device is decodable and then selects, based on the transmission band information, a decodable device which is expected to obtain high-quality video, as a device that the DTV 110 will request to alternatively play back the content. Further, by using the above multiple determination criteria in combination, the DTV 110 may select a decodable device which it will request to alternatively play back the content.

In S2110, the recorder 120, which has been requested to alternatively play back the content, transmits a DLNA message requesting the content to the content server 160.

In S2111, the content server receives the DLNA message requesting the content from the recorder 120 and transmits a DLNA message indicating that it can provide the content, as a response. S2109, S2110, and S2111 correspond to S2008 of FIG. 20.

In S2112, the recorder 120 transmits, to all the devices in the HDMI network including the recorder 120, a CEC broadcast message (e.g., <Active Source>) to notify each device of the start of video output and to request each device to secure a path for transmitting an HDMI video signal to the DTV 110. Upon receipt of this instruction, the DTV 110 changes the video input for displaying video to the input terminal 204 (or 205), which is coupled to the recorder 120, and then displays the video from the recorder 120 on the video display unit 220.

In S2113, the content server 160 provides the content to the recorder 120 through the DLNA network, and the recorder 120 decodes the content. S2112 and S2113 correspond to S2009 of FIG. 20.

In S2114, the video decoded by the recorder 120 is transmitted to the DTV 110 through the HDMI network and then displayed on the video display unit 220. S2114 corresponds to S2010 of FIG. 20.

In S2115, when the content is complete, the content server 160 transmits, to the recorder 120, a DLNA message, metadata of the content, or the like indicating that the content is complete.

In S2116, the recorder 120 transmits a DLNA message indicating that the transmission of the content is complete to the DTV 110.

In S2117, the DTV 110 generates a message to notify the user that the transmission of the content is complete or a list menu of pieces of content which can be selected next, using the OSD unit 215 and then displays the message or the like on the video display unit 220.

In S2118, the DTV 110, which no longer needs video output of the recorder 120, transmits a CEC broadcast message, such as a message <Active Source>, indicating that the DTV 110 itself has started playing back video to all the devices in the HDMI network including the DTV 110. The recorder 120 in the HDMI network receives this message and makes a transition to standby mode.

In the present embodiment, the above functions can be performed by any of a CEC message and a DLNA message may be used as a message transmitted or received between devices in the HDMI network. However, in the present embodiment, a DLNA message and a CEC message are used where appropriate so that the already standardized messages can be effectively used. The DLNA messages newly defined in S2107, S2108, and S2109 may be defined and used as CEC messages. All the CEC messages may be redefined and used as HEC or DLNA messages. In this case, a message which can be transmitted only to the devices in the HDMI network corresponds to a message of the first network; a message that can be transmitted beyond the HDMI network corresponds to a message of the second network.

The example where the recorder 120 is a device which alternatively decodes the content has been described in the above embodiment. However, any video playback devices, including dedicated playback devices and STBs, can alternatively decode the content, as long as the video playback device is a video device having a decoding function.

As seen above, according to the present embodiment, when an operation requested in the second network (DLNA network) cannot be performed, it is possible to perform the requested operation by using also the function of a device coupled to the first network (HDMI network).

Some or all of the above components, functions, processing units, processing means, and the like may be realized as hardware, for example, by designing these using integrated circuits. Alternatively, the above components, functions, and the like may be realized as software when a processor interprets and executes a program for realizing the functions. Information for realizing the functions, such as programs, tables, and files can be stored in a storage device, such as a memory, hard disk, or solid-state drive (SSD), or a storage medium, such as an IC card, SD card, or DVD.

The drawings show only control lines and information lines considered necessary for description and do not necessarily show all of the control lines and information lines of the product. It can be considered that almost all the components are actually coupled to each other.

REFERENCE SIGNS LIST

1 . . . user's home
2, 3 . . . broadcasting station
4 . . . IPTV server
5 . . . external network
11 . . . broadcast receiving antenna
12, 13 . . . distributor
14 . . . router
15 . . . hub
110, 130 . . . digital television (DTV)
120 . . . recorder
140 . . . IPTV set-top box (IPTV STB)
150 . . . set-top box (STB)
160 . . . content server
201 . . . antenna coupling terminal
202 . . . network terminal
203 . . . operation signal receiver
205 . . . system bus
204, 206 . . . input terminal
210 . . . tuner
211 . . . demodulator/decoder
212 . . . demultiplexer
213 . . . decoder
214 . . . combination unit
215 . . . OSD unit
216, 233 . . . input I/F
217, 218 . . . switch
219 . . . audio output unit
220 . . . video display unit
221 . . . network coupling unit
222 . . . control unit
223 . . . memory
214 . . . operation I/F
225 . . . limited reception I/F
226 . . . limited reception information storage unit 231 . . . AV receiver
232, 322 . . . data I/F
250 . . . operation device
301 . . . output terminal
310 . . . record playback unit
320 . . . output I/F
321 . . . AV transmitter
500, 600, 700 . . . control software
502 . . . program information generation unit
503 . . . display information acquisition unit
510 . . . first communication processing unit
511 . . . first message analysis/generation unit
512 . . . user-provided function management unit
513 . . . programmed recording processing unit
515 . . . command processing unit
516 . . . substitute search processing unit
517 . . . one-touch recording responding unit
521 . . . one-touch recording substitute unit
522 . . . programmed recording substitute unit
530 . . . second communication processing unit
531 . . . second message analysis/generation unit
532 . . . DMC unit
533 . . . programmed recording client
534 . . . content information client
535 . . . device information acquisition unit
540 . . . stream receiver
602, 702 . . . program information generation unit
603 . . . content management unit
604, 704 . . . programming setting management unit
610, 710 . . . first communication processing unit
611, 711 . . . first message analysis/generation unit
612 . . . user-provided function management unit
615, 715 . . . command processing unit
616, 716 . . . substitute search processing unit
621 . . . one-touch recording processing unit
625 . . . programmed recording responding unit
630, 720 . . . second communication processing unit
631, 731 . . . second message analysis/generation unit
632, 732 . . . DMS unit
633, 733 . . . programmed recording service
634 . . . content information service
635, 735 . . . device information providing service
640, 740 . . . stream transmitter

The invention claimed is:

1. A method for first, second, and third devices to transmit or receive a video signal, the first and second devices being coupled together through a first network, the first and third devices being coupled together through a second network which is a different network from the first network, and the second and third devices being coupled together through the second network, the method comprising:
when the first device cannot process a video signal received from the third device through the second network,
transmitting a limited multicast message from the first device to devices that are coupled to the first device by both the first network and the second network, via the second network to search for a device which can process the video signal which cannot be processed by the first device, the limited multicast message being addressed to only devices coupled to the first network, wherein a communication protocol of the first network is different from a communication protocol of the second network, and the limited multicast massage employs the communication protocol of the second network;
transmitting a response message from the second device to the first device through the second network, the response message indicating that the second device can process the video signal;
transmitting a request message from the first device to the second device to request the second device to process the video signal;
receiving, by the second device, the video signal from the third device through the second network;
processing, by the second device, the received video signal; and
transmitting, by the second device, the processed video signal to the first device through the first network.

2. The method of transmitting or receiving a video signal according to claim 1, wherein
the first device is a display device configured to display video,
the second device is a video playback device configured to decode a video signal,
the third device is a server configured to transmit a video signal, and
processing of the video signal is decoding of an encoded video signal, the method further comprising:
receiving, by the first device, information about a transmission band to expectedly be secured between the third device and the second device through the second network; and
determining, by the first device, whether to request the second device to decode the video signal, on the basis of the received information about the transmission band.

3. The method of transmitting or receiving a video signal according to claim 1, wherein
the first network is a High-Definition Multimedia Interface (HDMI) based network,
the second network is a Digital Living Network Alliance (DLNA) based network including an HDMI Ethernet Channel (HEC) which is an option of the HDMI,
the limited multicast message to be transmitted from the first device includes a hostname and a port number, the limited multicast message being transmitted through the HEC, and
the second device transfers the limited multicast message received through the HEC to the HEC of an HDMI terminal, other than a LAN terminal.

4. A display device for displaying video on the basis of a received video signal, comprising:
a first transmitter/receiver configured to transmit or receive a signal through a first network;
a second transmitter/receiver configured to transmit or receive a signal through a second network which is a different network from the first network;
a decoder configured to decode a video signal received by the second transmitter/receiver; and
a display unit configured to display video on the basis of a video signal received by the first transmitter/receiver or a video signal decoded by the decoder,
wherein when the decoder cannot decode an encoding format of a video signal received by the second transmitter/receiver, the second transmitter/receiver transmits a limited multicast message to devices that are coupled to the first transmitter/receiver by both the first network and the second network, via the second network to search for a device which can decode the video signal, the limited multicast message being addressed to only devices coupled to the first network, and a communication protocol of the first network is different from a communication protocol of the second network, and the limited multicast massage employs the communication protocol of the second network.

5. The display device of claim 4, wherein the display device is configured to:
   receive information about a transmission band to expectedly be secured between a content server and the device which can decode the video signal, and
   request the device which can decode the video signal to decode the video signal, based on the information about the transmission band.

6. The display device of claim 5, wherein
   the first network is a High-Definition Multimedia Interface (HDMI) based network,
   the second network is a Digital Living Network Alliance (DLNA) based network including an HDMI Ethernet Channel (HEC) which is an option of the HDMI,
   the limited multicast message to be transmitted includes a hostname and a portnumber, the limited multicast message being transmitted through the HEC.

7. A decoding device for decoding a video signal, comprising:
   a first transmitter/receiver configured to transmit or receive a signal through a first network;
   a second transmitter/receiver configured to transmit or receive a signal through a second network which is a different network from the first network; and
   a decoder configured to decode a video signal received by the second transmitter/receiver, wherein
   the second transmitter/receiver is further configured to:
      receive a limited multicast message which is an inquiry about a capability of the decoder, the limited multicast message being addressed to only devices coupled to the first network, and is sent from the first transmitter/receiver to devices that are coupled to the first device by both the first network and the second network, via the second network, wherein a communication protocol of the first network is different from a communication protocol of the second network, and the limited multicast massage employs the communication protocol of the second network,
      transmit information about a transmission band to expectedly be secured with a content server through the second network and information about the capability of the decoder to a source of the limited multicast message, and
      receive a video signal from the content server,
   the decoder decodes the received video signal, and
   the first transmitter/receiver transmits the decoded video signal to a device other than the content server.

8. The method of transmitting or receiving a video signal according to claim 1, wherein the first device and the second device are coupled to each other through the second network.

* * * * *